United States Patent [19]
Hoel et al.

[11] Patent Number: 5,392,422
[45] Date of Patent: Feb. 21, 1995

[54] SOURCE SYNCHRONIZED METASTABLE FREE BUS

[75] Inventors: Jeffrey H. Hoel, Los Altos; Michel Cekleov; Pradeep S. Sindhu, both of Mountain View, all of Calif.

[73] Assignees: Sun Microsystems, Inc., Mountain View, Calif.; Xerox Corporation, Stamford, Conn.

[21] Appl. No.: 905,098

[22] Filed: Jun. 26, 1992

[51] Int. Cl.$^6$ .......................... G06F 13/00; G06F 1/04
[52] U.S. Cl. ..................................... 395/550; 395/200; 395/325
[58] Field of Search ................ 395/200, 275, 325, 425, 395/550

[56] References Cited

U.S. PATENT DOCUMENTS

| | | | |
|---|---|---|---|
| 4,523,274 | 6/1985 | Fukunaga et al. | 395/550 X |
| 5,280,591 | 1/1994 | Garcia et al. | 395/725 X |

FOREIGN PATENT DOCUMENTS

| | | | |
|---|---|---|---|
| 0344736 | 12/1989 | European Pat. Off. | G06F 13/42 |
| 0347557 | 12/1989 | European Pat. Off. | G06F 13/42 |
| 0378426 | 7/1990 | European Pat. Off. | G06F 13/42 |
| 2166930 | 5/1986 | United Kingdom | H04L 11/16 |

*Primary Examiner*—Robert L. Richardson
*Attorney, Agent, or Firm*—Blakely Sokoloff Taylor & Zafman

[57] ABSTRACT

The bus of the present invention advantageously utilizes high-speed, source synchronized data transfers and lower-speed, globally synchronized transfers of arbitration and consistency information. In a first embodiment, a high speed clock signal and slower speed clock enable signal are globally distributed from a central arbiter to agents coupled to the bus. A sending agent utilizes the high speed clock signal for source synchronized data transfers by forwarding the high speed clock signal, along with the data, to one or more receiving agents. Thus, the globally distributed clock signal is used to accomplish source synchronized data transfers. Arbitration requests, by contrast, are processed at the slower clock enable signal rate in a globally synchronous fashion. In addition, by communicating data cycles information from the central arbiter to the receiving agent at the slower clock enable signal rate, the present invention avoids resynchronization and the possibility of metastability. Dead time between packets of data is minimized in the present invention by placing the central arbiter in the center of the bus. An alternative embodiment is disclosed wherein a slower speed clock signal is globally distributed to a plurality of agents and a central arbiter. Each agent then generates a high speed clock signal that is divided down and phase locked to the slower speed clock signal, and this high speed clock signal is then utilized for high-speed, source synchronized data transfers. Arbitration and consistency information are handled at the slower speed clock signal rate. In the alternative embodiment, resynchronization is avoided through the use of a header signal.

20 Claims, 19 Drawing Sheets

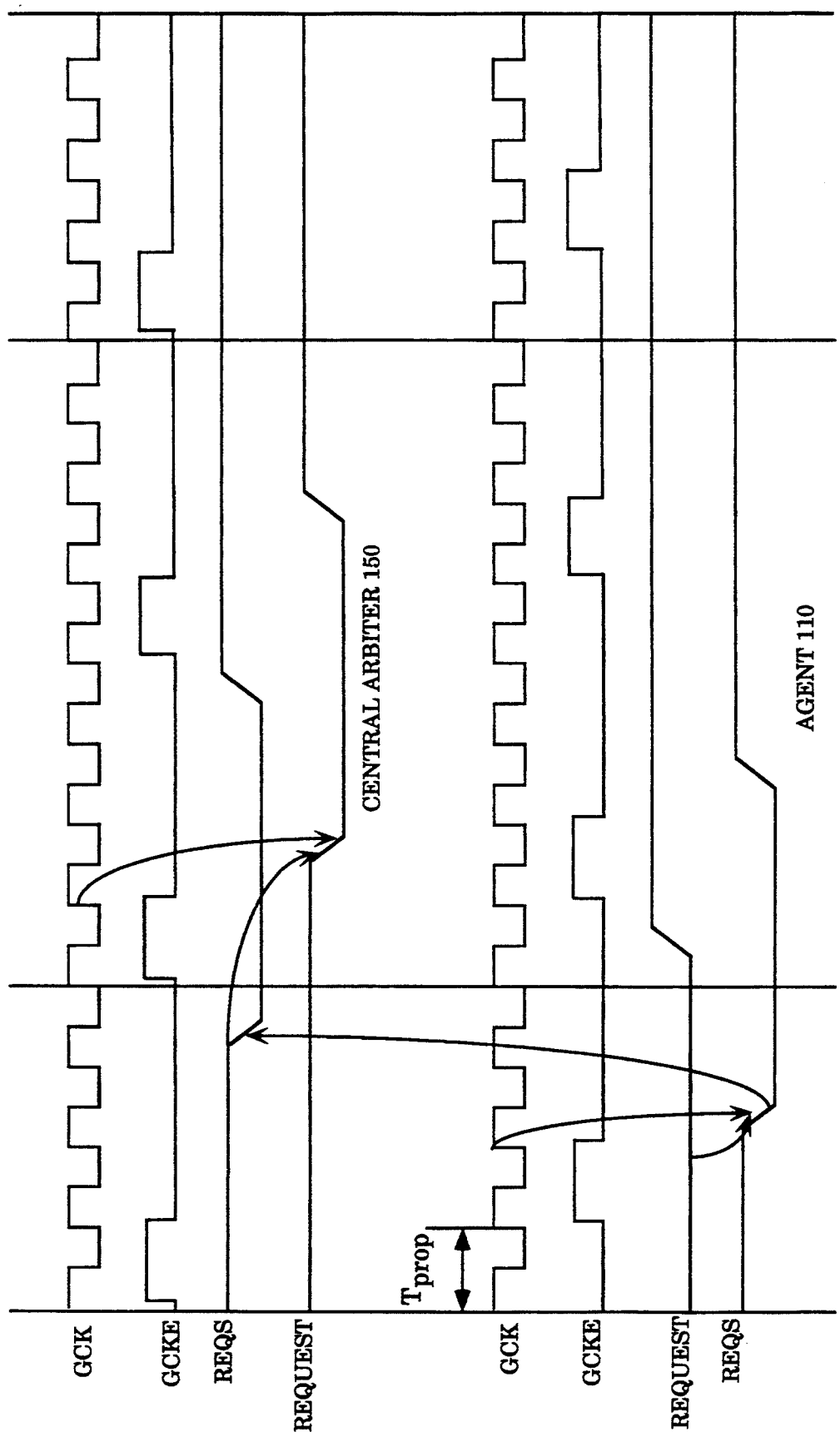

ENABLE GENERATOR WAVE FORM FOR 2 CYCLE PACKET:
(PKT SIZE BIT = 0):

ENABLE GENERATOR WAVE FORM FOR 9 CYCLE PACKET:
(PKT SIZE BIT = 1):

SOURCE SYNCHRONIZED METASTABLE FREE BUS

BACKGROUND OF THE INVENTION

1. Field of the Invention

The present invention relates to a method and apparatus for transferring information among a plurality of data processing devices. More particularly, the present invention relates to an improved computer bus utilizing both source synchronized data transfers and globally synchronized transfers of arbitration and consistency information which eliminates resynchronization and metastability.

2. Art Background

In the computing industry it is quite common to transfer information among a plurality of data processing devices such as processors, memories, input/output devices, peripheral controllers, and the like, on a system bus. A system bus is essentially a collection of wires which connects the various devices together in a prescribed fashion. Typically, a system bus includes address lines, data lines, clock lines, power lines, and a number of control signal lines. Frequently, access to the system bus, as a shared resource, must be arbitrated, and a bus protocol or "handshake" routine is observed by all data processing devices coupled to the bus. Such a bus protocol requires a predetermined sequence of events to take place prior to the actual exchange of data between devices coupled to the bus.

The overall speed and performance of a particular data processing system is greatly influenced by the design and method of operation utilized by its system bus. Two measures of system bus performance are latency and throughput. Latency is the time delay between a device's request to use the bus and an arbiter's granting of that request. Throughput refers to the rate at which a device can transmit data on the bus once it has been granted the right to do so.

Typically, the data corresponding to one bus access request is transmitted in a multi-cycle packet, because the number of bits of information to be transmitted is many times the number of bus wires used for transmitting data. It is desirable that data transmission have high throughput. Arbitration and cache consistency information, however, represent only a few bits of information per bus access, and enough bus wires are typically provided to transmit this information in one or two cycles. For this information, therefore, low latency is more important than high throughput.

It is, therefore, desirable to have a bus with low latency and high throughput to minimize the amount of computing time required for a particular data processing task. With the increased use of multiprocessing, it is further important that a bus apparatus and method of operation support multiprocessing.

Data transfer over a bus can be accomplished utilizing globally synchronized data transfers or source synchronized data transfers. In a globally synchronized data transfer, a central global clock provides the clocking to all devices, including the device sending the data and the device receiving the data. In contrast, in a source synchronized data transfer, the device sending the data sends both the data and the clock signal to the receiving device. In a source synchronized data transfer, the data is frequently stored in a data buffer within the receiving device using the received clock until the receiving device is ready to read the data. When the data is read from this data buffer, it is read out under the control of a local clock on the receiving device. In the prior art, such a process has typically required resynchronization with the attendant risk of metastability.

As will be described, the apparatus and method of the present invention advantageously utilizes high-speed, source synchronized data transfers and lower-speed, globally synchronized transfers of arbitration and consistency information. The bus of the present invention supports cache-coherent multiprocessing, and is advantageously utilized within a packet switched protocol. Further, the method and apparatus of the present invention effectively eliminates the possibility of metastability associated with resynchronization.

SUMMARY OF THE INVENTION

A high speed source synchronized metastable free bus is disclosed. The bus has particular application in multiprocessor computer systems. The bus utilizes high speed, source synchronized data transfers and lower speed, globally synchronized transfers of arbitration and consistency information. A first embodiment is disclosed wherein a high speed clock signal and slower speed clock enable signal are globally distributed from a central arbiter to agents coupled to the bus. When an agent is granted control of the bus, that agent utilizes the high speed clock signal provided by the central arbiter in order to accomplish source synchronized data transfers. The high speed clock signal is "forwarded" to a data clock line, while synchronously, the data is coupled to data lines. The data is thus transferred from a sending agent to a receiving agent in a source sychronized fashion using the "forwarded" high speed clock signal.

Arbitration requests and arbitration grants, in contrast, are processed at the rate of the slower clock enable signal in a globally synchronous fashion. In a first embodiment, a slower global clock enable signal controls the processing of arbitration information via a slower global clock enable line coupled from the central arbiter to each agent. This embodiment avoids the need for resynchronization and eliminates the possibility of metastability by communicating from the central arbiter to a receiving agent at the slower global clock enable signal rate information about the number of cycles of data transferred ("interactive" information). In this way, the receiving agent receives this "interactive" information in a globally synchronous fashion, and consumes data when it is stable within the receive data buffer. This embodiment readily supports cache-coherent multiprocessing, and is advantageously utilized in a packet switched protocol. Dead time between packets of data is minimized in the present invention by placing the central arbiter in the center of the bus.

An alternative embodiment is disclosed wherein a slower speed clock signal is globally distributed to a plurality of agents and a central arbiter. Each agent then generates a high speed clock signal that is phase locked to this slower speed clock signal, and this fast clock signal is then utilized for high-speed, source synchronized data transfers. Arbitration and consistency information is handled at the slower speed dock signal rate. In the alternative embodiment, resynchronization and metastability are avoided through the use of a header signal, signalling the beginning of a data packet, and sent at the slower speed clock signal rate.

BRIEF DESCRIPTION OF THE DRAWINGS

Further details are explained below with the help of the examples illustrated in the attached drawings in which.

DETAILED DESCRIPTION OF THE INVENTION

An improved high speed bus is described having particular application for use in computer systems. In the following description, for purposes of explanation, numerous details are set forth such as specific frequencies, bandwidths, data paths, etc., in order to provide a more thorough understanding of the present invention. It will be appreciated by one skilled in the art, however, that the present invention may be practiced without these specific details. In other instances in the description which follows, well known electrical structures and circuits are shown in block diagram form in order not to obscure the present invention unnecessarily.

While the present invention will be described within a certain context, it will be apparent to one skilled in the art that the present invention is in no way limited to this particular context, but instead finds application in a wide variety of data processing systems. In particular, the present invention is advantageously utilized within a system characterized by packet switched data transfers, cache-consistency, snooping, and pipelining of shared-/owner information. The present invention is particularly well suited for application in conjunction with the system and bus protocol disclosed in three U.S. patent applications filed Nov. 30, 1990, by Sindhu et al., assigned to the co-Assignee of the present application, Xerox Corporation, entitled: CONSISTENT PACKET-SWITCHED MEMORY BUS FOR SHARED MEMORY MULTI-PROCESSORS, CONSISTENCY PROTOCOLS FOR SHARED MEMORY MULTI-PROCESSORS, and ARBITRATION OF PACKET-SWITCHED BUSES INCLUDING BUSES FOR SHARED MEMORY MULTI-PROCESSORS.

Figure 1:
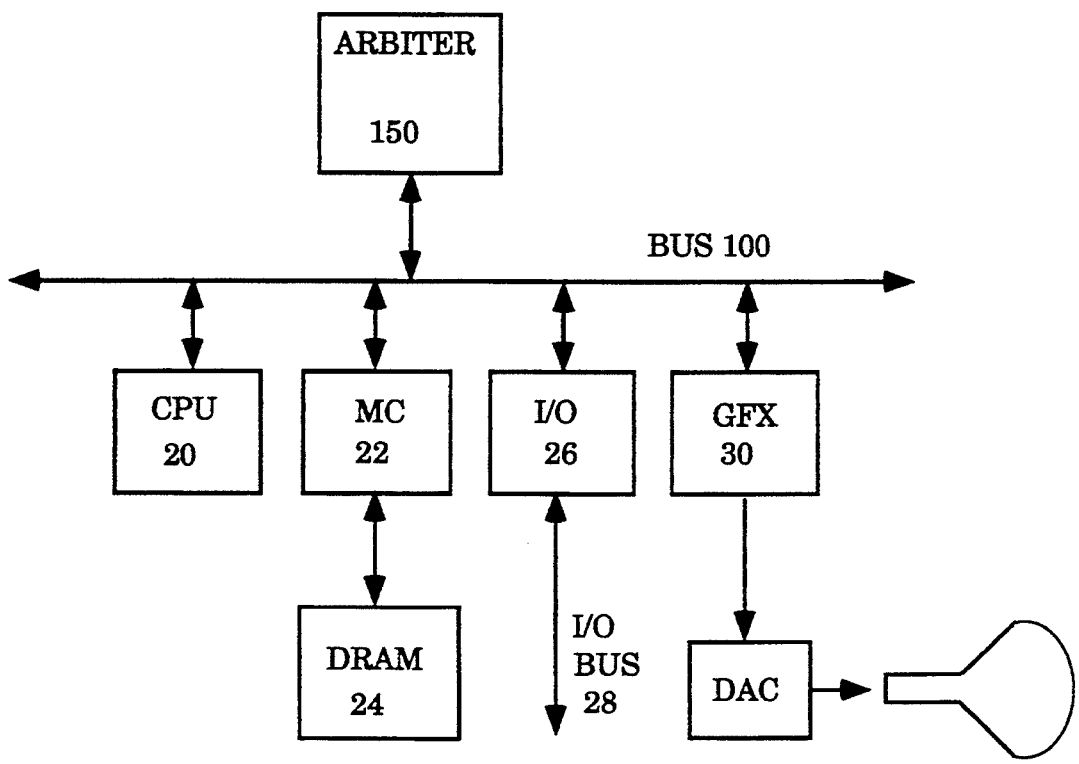
FIG. 1 is a block diagram illustrating the components of one possible computer system in which the present invention can be utilized.

Referring now to FIG. 1, the components of one possible computer system in which the present invention can be utilized are shown. In this basic system, a central processing unit (CPU) 20 communicates with a number of data processing and peripheral devices over bus 100. For purposes of this Specification, the data processing and peripheral devices which are coupled to the bus 100 of the present invention will, hereinafter, be collectively referred to as "agents." In this figure, these agents include: a memory controller 22 coupled to DRAM 24, an input/output device 26, further coupled to an I/O bus 28, and a GFX module 30. Additional agents including coprocessors, disk interfaces, or network interfaces can be added to the data processing system if desired.

Continuing to refer to FIG. 1, bus 100 includes a plurality of individual lines which carry data and control signals to the various agents in the computer system. A central arbiter 150 arbitrates requests for control of the bus 100 from the agents coupled to bus 100. Data transfers take place over bus 100. As will be described, the bus 100 of the present invention advantageously utilizes both high-speed, source synchronized data transfers, and lower-speed, globally synchronized transfers of arbitration requests and cache consistency information. Further, the bus 100 of the present invention effectively eliminates the problems of metastability associated with resynchronization. The fundamental difference between source synchronized data transfers and globally synchronized data transfers over a bus will now be described.

Figure 2:
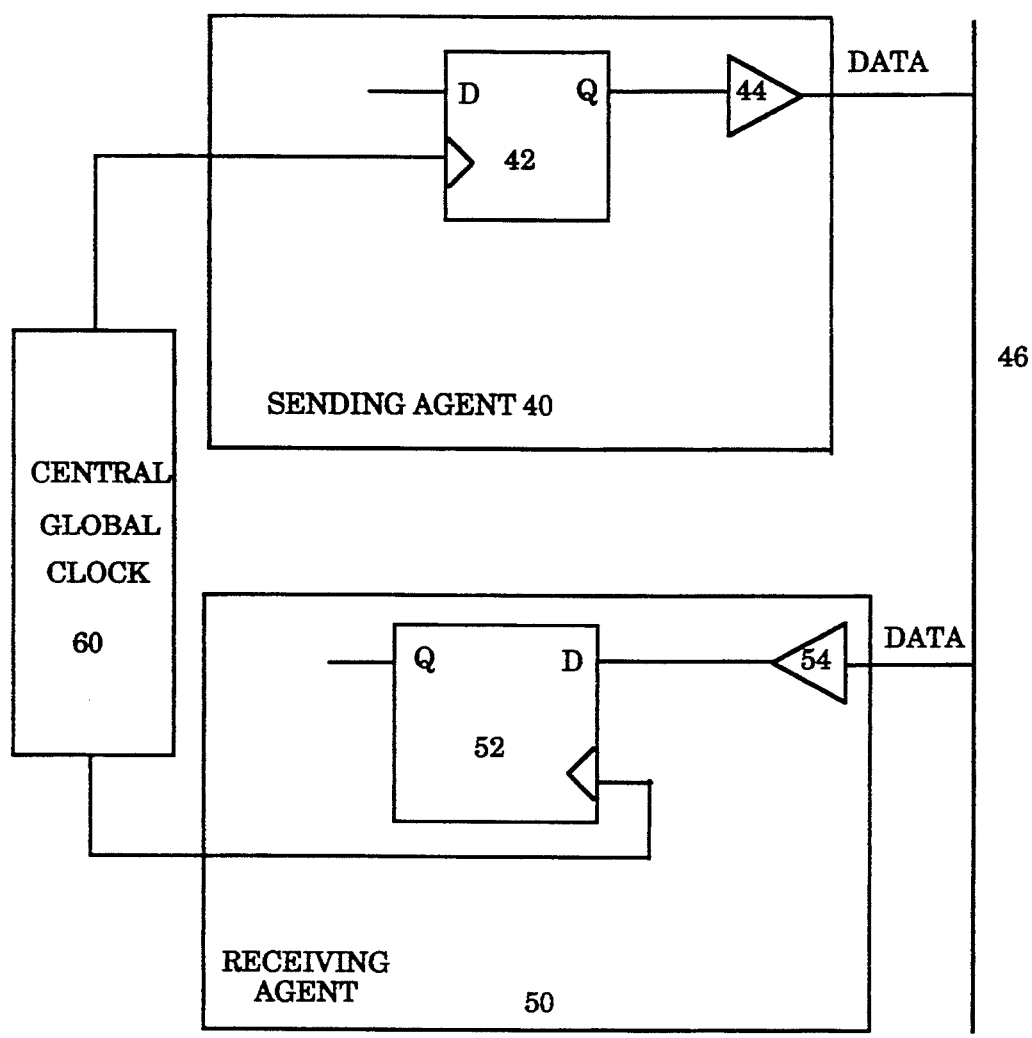
FIG. 2 illustrates, in simplified form, the circuitry utilized in a globally synchronous data transfer.

Referring to FIG. 2, this figure illustrates in simplified form, the circuitry utilized in a globally synchronized data transfer between an agent sending data, shown here as sending agent 40, and an agent receiving the data, shown here as receiving agent 50. As illustrated in FIG. 2, the sending agent 40 includes a flip-flop 42 coupled to a driver 44, while the receiving agent 50 includes a receiver 54 coupled to a flip-flop 52. A central global clock 60 provides a global clock signal to both the sending agent 40 and the receiving agent 50. In order to prevent the skewing of these clock signals, the wires used to couple global clock 60 to sending agent 40 and receiving agent 50 are, ideally, of the same length and electrical characteristics.

In FIG. 2, data is transferred from the sending agent 40 to the receiving agent 50 over data line 46. (For illustrative purposes, a single data line is shown; in actual application, a plurality of such data lines would be used, substantially in parallel, to carry a byte or bytes of information.) In particular, the data to be transferred is initially docked out of flip-flop 42 under control of the central global clock 60. The data is then sent to driver 44, which drives the data to data line 46. The data then travels from the sending agent 40 to the receiving agent 50 where it is received by the receiver 54 which presents the data to flip-flop 52. The data is clocked into flip-flop 52 under control of the central global clock 60.

It will be appreciated that globally synchronous data transfers necessarily involve significant delays. As an initial matter, it can be noted that only a single bit can be transmitted from the sending agent 40 to the receiving agent 50 on the data line 46 in one clock period. Thus, the rate at which bits are communicated over the data line 46 equals the frequency of the clock. Unfortunately, the frequency of the clock is constrained by a number of delays inherent in transmitting electrical signals from one place to another. In order to transmit data reliably from sending agent 40 to receiving agent 50, the period of the clock (1/frequency) must be larger than the time taken for a signal to travel from the sending flip-flop 42, through the driver 44, over the data line 46, and through the receiver 54, before reaching and being registered in the receiving flip-flop 52.

Furthermore, in the practical implementation of such a system, the actual wires used to distribute the central global clock 60 to the sending agent 40 and the receiving agent 50 are rarely of precisely the same length and same electrical characteristics (impedance). As a result, the clock signal received by the receiving agent 50 is skewed with respect to the clock signal provided to the sending agent 40, and a skew delay is realized. The skew associated with differing wire lengths, referred to as the geographical skew, is particularly marked when the bus incorporates a large number of data lines. A second type of skew, referred to as technological skew, results from differences in the characteristics of electrical devices. These skew terms must be added to a signal propagation delay to determine the minimum clock period for reliably transmitting data. Thus, in a globally synchronous system, the clock rate is limited both by a signal propagation delay and by skew, thereby causing the rate of data transmission to be limited as well.

Referring now to TABLE 1, this table provides specific terms and exemplary values for the delays realized in a globally synchronized data transfer as illustrated in FIG. 2. The exemplary values correspond to exemplary maximum values.

TABLE 1

| | | |
|---|---|---|
| (1) $t_{ck-Q}$ | $t_{ck-Q-max} = 0.5$ ns (internal flip-flop) | |
| (2) $t_{dr}$ | $t_{dr-max} = 2.5$ ns (bus driver) | |
| (3) $t_{prop}$ | $t_{prop-max} = 4$ ns (12 in/3 in/ns) | |
| (4) $t_{rc}$ | $t_{rc-max} = 2.5$ ns (bus receiver) | |
| (5) $t_{setup}$ | $t_{setup} = 0.5$ ns (internal flip-flop setup) | |
| (6) $t_{skew}$ | $t_{skew} = 1.5$ ns (geographical and technological skew) | |

The terms found in TABLE 1 can be related to the elements in FIG. 2 as follows. Referring to both TABLE 1 and FIG. 2, the first term, $t_{ck-Q}$, corresponds to the delay experienced from the time at which the clock makes a low to high transition at flip-flop 42, to the time at which the output data takes on its new value at flip-flop 42. The second term, $t_{dr}$, corresponds to the propagation delay through driver 44. The third term, $t_{prop}$, a particularly significant term, corresponds to the propagation delay resulting from the transmission of the data over the length of data line 46. The value for this term in TABLE 1 assumes a data line 12 inches long, with a propagation delay of approximately 1 ns/3 inches. Such an assumption would correspond to the situation wherein a number of agents are coupled to a bus 12 inches long, with the sending agent 40 located at one end of the bus, and the receiving agent 50 located at the other end of the bus. The fourth term, $t_{rc}$, corresponds to the amount of time it takes to propagate through receiver 54, while the fifth term, $t_{setup}$, expresses the amount of set up time needed for flip flop 52 to register the data correctly. The sixth term, $t_{skew}$, corresponds to the skew between the clocking of the sending agent 40 and the receiving agent 50.

It will be appreciated from FIG. 2 and TABLE 1 that the maximum cycle time (time interval between bits of data), $t_{cycle}$, in a globally synchronized data transfer system, must satisfy the following equation: $t_{cycle} > t_{ck-Q-max} + t_{dr-max} + t_{prop-max} + t_{rc-max} + t_{setup} + t_{skew}$. Thus, using the above values provided in TABLE 1 for these terms, $t_{cycle} > 11.5$ ns. Thus, in a globally synchronized system with the exemplary parameters provided in TABLE 1, the clock cannot be run faster than 1/11.5 ns or 87 MHz. The data rate per wire, therefore, cannot exceed 87 Mbits/second. Source synchronized data transfers will now be described.

Figure 3:
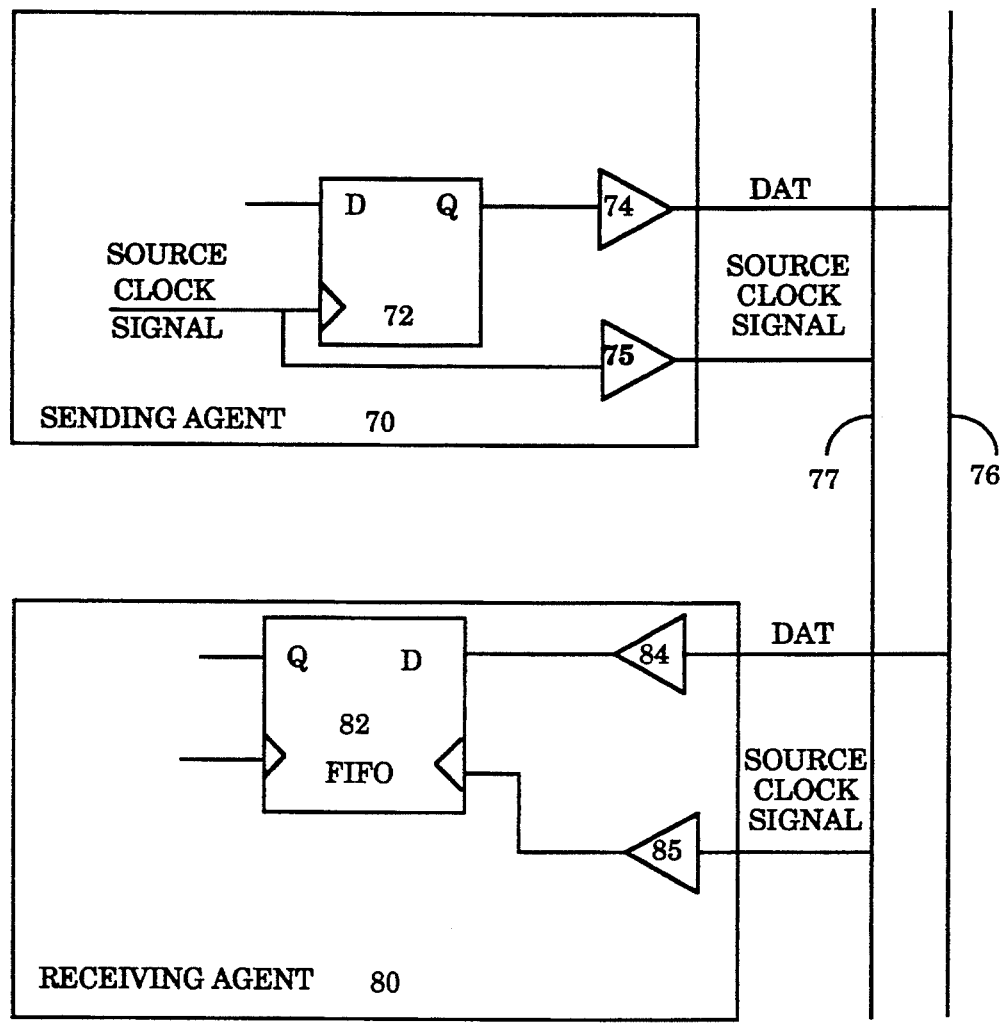
FIG. 3 illustrates, in simplified form, the circuitry utilized in a source synchronized data transfer.

Referring to FIG. 3, this figure illustrates in simplified form, the circuitry utilized in a source synchronized data transfer between a sending agent 70 and a receiving agent 80. As illustrated in FIG. 3, the sending agent 70 includes a flip-flop 72, a driver 74, and a driver 75, while the receiving agent 80 includes a First In First Out (FIFO) Data Buffer 82, a receiver 84, and a receiver 85. A source clock signal is coupled to flip-flop 72, as well as driver 75. The FIFO Data Buffer 82 stores transferred data for receiving agent 80 until receiving agent 80 reads the data out of FIFO Data Buffer 82. The instantaneous rate at which data is entered into FIFO Data Buffer 82 can thus be independent of the instantaneous rate at which the data is read by the receiving agent 80.

Continuing to refer to FIG. 3, in this source synchronized data transfer system, both the data (DAT) and the source clock signal are transferred from the sending agent 70 to the receiving agent 80. Initially, the data (DAT) to be transferred is clocked out of flip-flop 72 under control of the source clock signal. The data (DAT) and the source clock signal are then coupled, respectively, to driver 74 and driver 75. Driver 74 and driver 75 then couple the data (DAT) and the source clock signal, respectively, to data line 76 and source clock line 77. (Again, for illustrative purposes, only a single data line is shown and discussed.) Data line 76 and source clock line 77 couple the data (DAT) and the source clock signal, respectively, to receiver 84 and receiver 85. Within receiving agent 80, the data (DAT) is then clocked into FIFO data buffer 82 under the control of the source clock signal.

Thus, it can be appreciated that in this source synchronized data transfer, the data and the source clock signal essentially proceed in a parallel fashion from the sending agent 70 to the receiving agent 80. Ideally, within such a transfer, the drivers, receivers, and the wires for the clock and data paths are matched, thereby minimizing propagation differences. For example, it is important that driver 74 and driver 75 be matched drivers. Data line 76 and source clock line 77 should additionally be matched wires of the same length, with the same electrical characteristics. Receivers 84 and 85 should also be matched.

Referring now to TABLE 2, this table provides specific terms and exemplary values for the delays incurred in a source synchronized data transfer as illustrated in FIG. 3. The exemplary values correspond to exemplary maximum values.

TABLE 2

| | | |
|---|---|---|
| (1) | $t_{ck-Q}$ | $t_{ck-Q\ max}$ = 0.5 ns (internal flip-flop) |
| (2) | $\Delta t_{dr}$ | $\Delta t_{dr}$ = 0.2 ns (difference between bus drivers' propagation delays) |
| (3) | $\Delta t_{prop}$ | $\Delta t_{prop}$ = 0.2 ns (difference between prop delays: ± 2.5%) |
| (4) | $\Delta t_{rc}$ | $\Delta t_{rc}$ = 0.2 ns (difference between bus receivers' propagation delays) |
| (5) | $t_{setup}$ | $t_{setup}$ = 0.5 ns (internal flip-flop setup) |

Referring now to both TABLE 2 and FIG. 3, the first term, $t_{ck-Q}$, corresponds to the delay experienced from the time at which the clock makes a low to high transition at flip-flop 72 to the time at which the output data takes on its new value at flip-flop 72. The second term, $\Delta t_{dr}$, corresponds to the difference in propagation delays between driver 74 and the driver 75. The third term, $\Delta t_{prop}$, corresponds to the difference in propagation delays between data line 76 and source clock line 77. The fourth term, $\Delta t_{rc}$, corresponds to the difference between the propagation delay of receiver 84 and the propagation delay of receiver 85, while the fifth term, $t_{setup}$, expresses the amount of set up time needed for FIFO Data Buffer 82 to register the data correctly.

It will be appreciated from FIG. 3 and TABLE 2 that the cycle time, $t_{cycle}$, (time interval between bits of data) in a source synchronized data transfer system must satisfy the following equation: $t_{cycle} > t_{ck\ Q-max} + \Delta t_{dr} + \Delta t_{prop} + \Delta t_{rc} + t_{setup}$. Therefore, using the exemplary values provided in TABLE 2 for these terms, $t_{cycle} > 1.6$ ns. Thus, in a source synchronized system whose parameters are described by TABLE 2, the clock cannot be run faster than 1/1.6 ns or 625 MHz. This means that the data rate per wire is also 625 Mbits/sec or more than seven times the data rate of the previously described globally synchronized system. It will be appreciated that the output signals generated by flip-flop 72, drivers 74 and 75, and receivers 84 and 85 of FIG. 3 must have rise and fall times sufficeintly short to allow operation at this data rate. The present invention's utilization of high-speed, source synchronized data transfers in combination with lower-speed, globally synchronized transfers of arbitration requests and consistency information will now be described.

Figure 4:
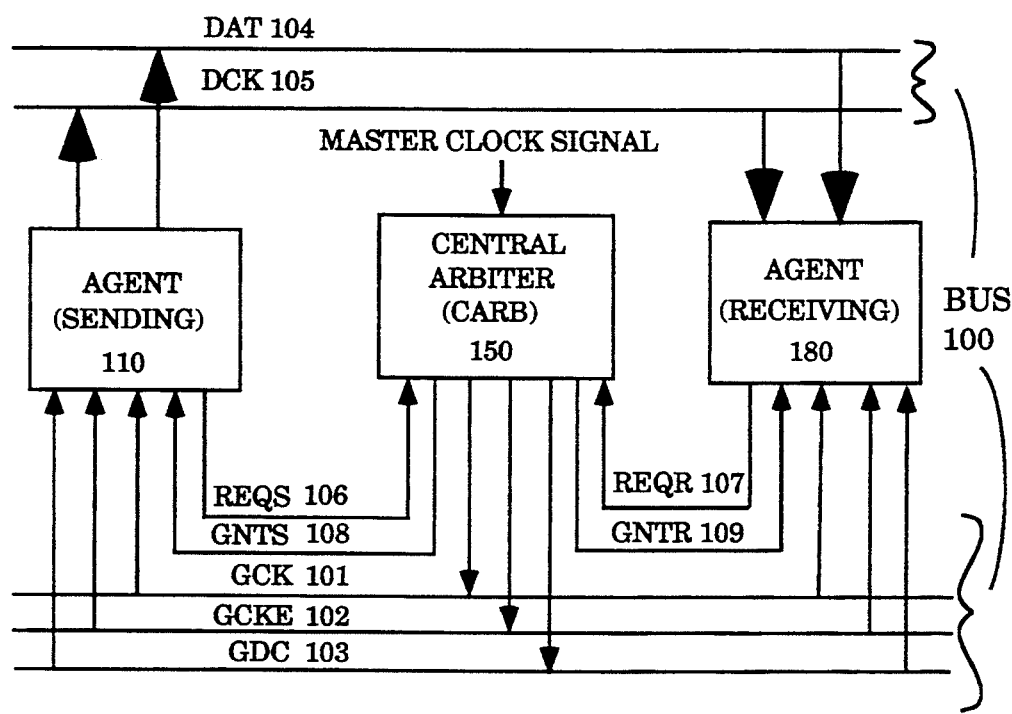
FIG. 4 illustrates in block diagram form, an overview of the apparatus and method of the presently preferred embodiment.

Referring now to FIG. 4, this figure illustrates in block diagram form, an overview of a first embodiment of the invention. As illustrated, a first agent 110, a second agent 180, and a central arbiter 150 are coupled to bus 100. For pedagogical reasons, only two agents are illustrated. As previously described, the present invention is in no way limited to this particular context. In particular, a number of additional agents can be coupled to bus 100, limited only by the electrical loading of bus 100. The bus 100 of the present invention is comprised of a plurality of lines including: a global clock (GCK) line 101, a global clock enable (GCKE) line 102, global data cycles (GDC) lines 103, data (DAT) lines 104 (for illustrative purposes only one data line is shown), and a data clock (DCK) line 105. In addition, the bus 100 includes a request (REQS) line 106 and a bus grant (GNTS) line 108 for agent 110, as well as a request (REQR) line 107 and a bus grant (GNR) line 109 for agent 180. Each agent coupled to bus 100 has its own bus request line and bus grant line.

In the embodiment of the present invention illustrated in FIG. 4, the central arbiter 150, in addition to arbitrating requests for control of the bus, also couples a global clock signal (GCK) to global clock line 101. The global clock signal (GCK), itself, can be generated within the central arbiter 150, or alternatively, as illustrated in FIG. 4, provided from an outside source to the central arbiter 150 in the form of a master clock signal. In this embodiment, the global clock signal (GCK) advantageously operates at a high frequency, for example, 250 MHz. This high frequency global clock signal (GCK) is then coupled to global clock line 101 which provides the global clock signal (GCK) to the various agents coupled to bus 100.

Continuing to refer to FIG. 4, an agent requests control of the bus by asserting a bus request over its request line. As described, each agent which at some time will control the bus has a unique request line coupled to the central arbiter 150. The central arbiter 150 arbitrates such requests, then grants a particular agent control of the bus by asserting a bus grant signal over a bus grant line coupled to that particular agent. Thus, for example, agent 110 requests control over bus 100 by asserting a bus request signal (REQS) over bus request line 106. Central arbiter 150 can then grant control of bus 100 to agent 110 by asserting a bus grant signal (GNTS) over bus grant line 108.

An agent which is granted control of the bus transfers data (DAT) over data line 104. (For purposes of simplicity and clarity, again, a single data line is illustrated and discussed.) Data clock line 105, it will be explained, provides the data clock signal (DCK) for source synchronized data transfers. As will also be described, global clock enable (GCKE) line 102 effectively serves as a control line in the present invention, controlling the timing of arbitration and consistency information, while global data cycles lines 103, provide data cycles information (GDC) to agents coupled to bus 100 such that resynchronization and metastability are eliminated.

The present invention's apparatus and method for high-speed, source synchronized data transfers will now De described with reference to FIG. 4. In the discussion which follows, agent 110 will be referred to as the "sending agent", while agent 180 will be referred to as the "receiving agent." In general, there could be many receiving agents. As a general matter, sending agent 110 forwards the high frequency global clock signal to the receiving agent 180 in order to accomplish high-speed, source synchronized data transfer. More specifically, sending agent 110 accomplishes high speed source synchronized data transfer by coupling data (DAT) to data line 104, while also coupling the global clock signal (GCK) to data clock line 105. It will be recalled that the global clock signal (GCK), itself, is provided to sending agent 110 by the central arbiter 150.

Thus, in the present invention, high-speed, source synchronized data transfer is accomplished through the "forwarding" of a globally distributed clock signal. It will be appreciated that with such an approach, the overall system can be designed with an understanding of the nature and frequency of the clock which is going to be forwarded with the data. In essence, there is only one globally known clock rate, and it is provided by the central arbiter 150 to the agents coupled to bus 100.

Figure 5:
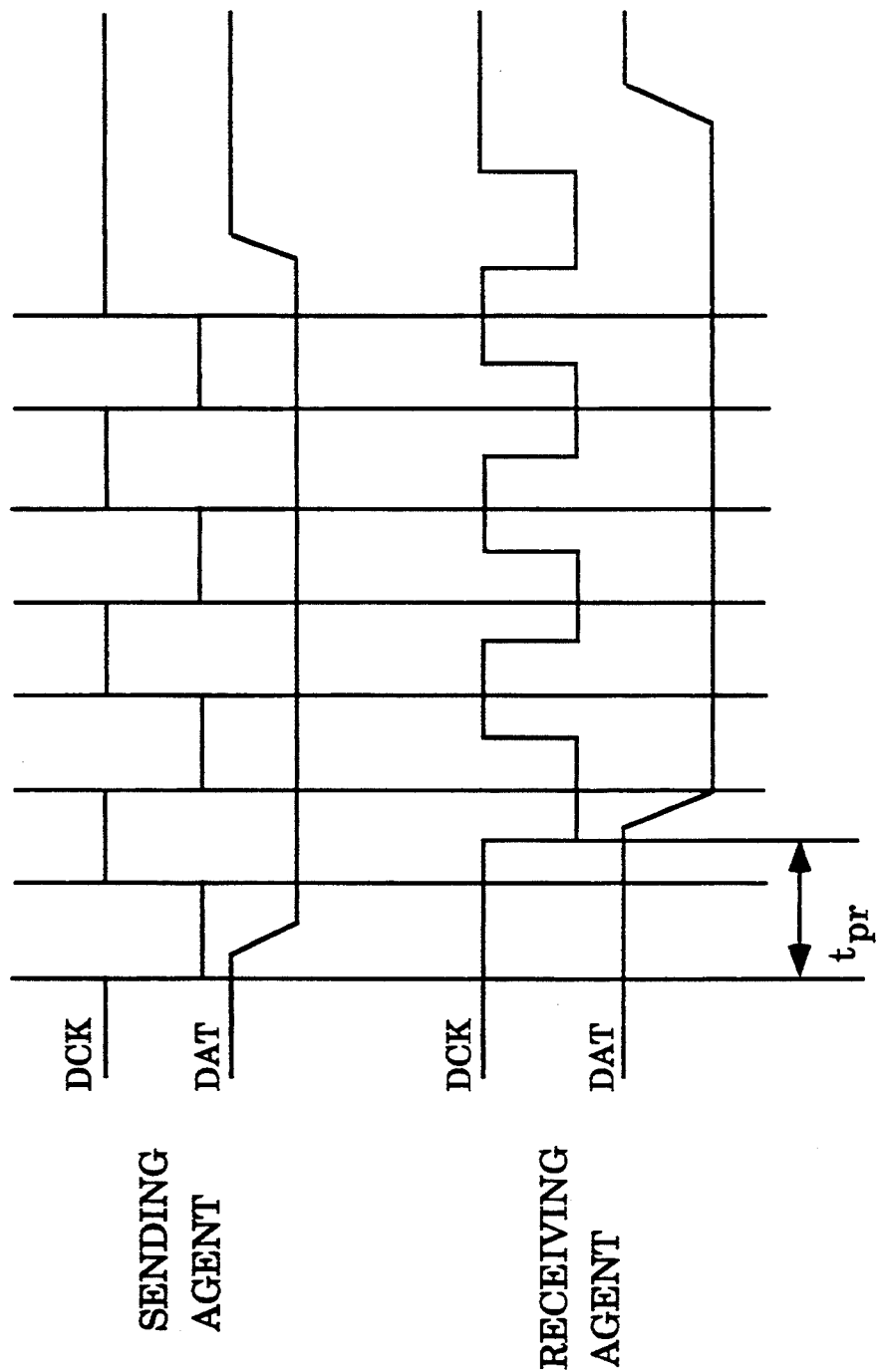
FIG. 5 illustrates the timing relationship between the data transfer signals issued by a sending agent and the data transfer signals received by a receiving agent.

Referring now to FIG. 5, this figure illustrates the timing relationship between the signals issued from tile sending agent 110 and the signals received by the receiving agent 180 in FIG. 4. The vertical lines in FIG. 5 represent absolute time in the system. (All signals, except clock signals, are considered active low.) The source synchronized data transfer of the present invention can be under-stood through reference to FIGS. 4 and 5. Sending agent 110 couples a data signal (DAT) and a data clock signal (DCK), respectively, to data line 104 and data clock line 105. As previously described, the data clock signal (DCK) which is coupled to data clock line 105 is derived from the global clock signal (GCK) which the arbiter 150 provides to sending agent 110. After an initial propagation delay, $t_{pr}$, the data clock signal (DCK) and data signal (DAT) are received by the receiving agent 180, and source synchronized data transfer is accomplished.

Figure 6:
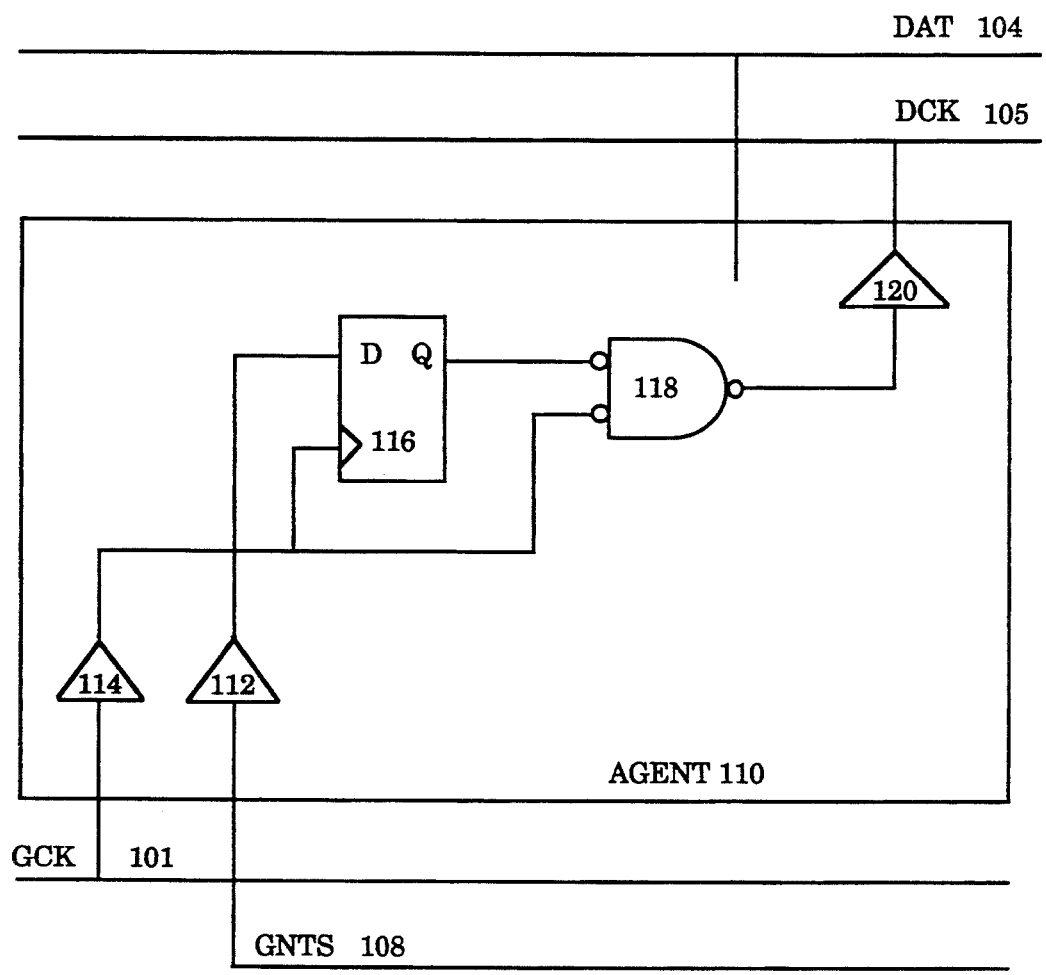
FIG. 6 illustrates an embodiment of the circuitry used to forward, for source synchronized data transfers, the globally distributed clock signal.

Referring now to FIG. 6, this figure illustrates an embodiment of the circuitry used to "forward" the global clock signal (GCK) in the present invention, thereby utilizing a high-speed, globally distributed clock for high-speed source synchronized data transfers. In this figure, agent 110, global clock line 101, data line 104, data dock line 105, and bus grant line 108 are shown.

Assuming agent 110 wishes to transfer data over bus 100, and is granted the right to use the bus, the central arbiter 150 (not shown in this figure) asserts the bus grant line 108 low. This bus grant signal (GNTS) is coupled to a receiver 112, which then couples the signal to a flip-flop 116 operating under the control of the global clock signal (GCK) provided by global clock line 101. Flip-flop 116 couples the bus grant signal (GNTS) to a logic gate 118, to which the global clock signal (GCK) is also coupled. The global clock signal (GCK) is thereby "forwarded" to the data clock line 105 when agent 110 is granted control of the bus. Agent 110, thereafter, drives both the data (DAT) over data line 104 and a synchronized data clock signal (DCK) over data clock line 105. Thus, a globally distributed clock signal is "forwarded" to accomplish source synchronized data transfer.

Figure 7A:
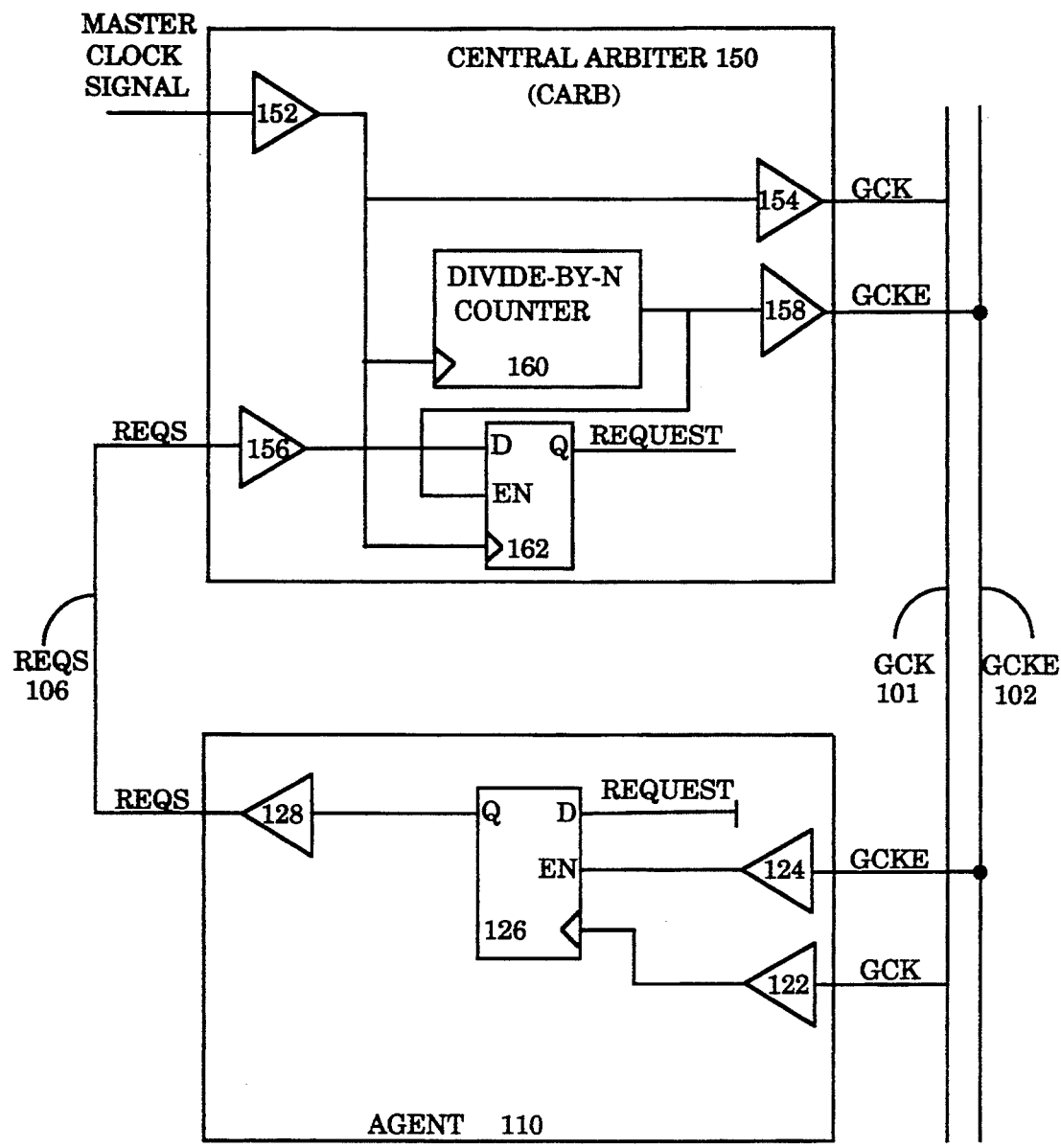
FIGS. 7A and B illustrate the global synchronization of arbitration requests and consistency information.

Referring now to the block diagram of FIG. 7A and the timing diagram of FIG. 7B, these figures illustrate the global synchronization of arbitration requests and consistency information in the present invention. As illustrated in FIG. 7A, the central arbiter 150 comprises drivers 154 and 158, receivers 152 and 156, a Divide-By-N Counter 160, and a flip-flop 162. Agent 110 includes driver 128, receivers 122 and 124, as well as a flip-flop 126. Global clock (GCK) line 101, global clock enable (GCKE) line 102, and request (REQS) line 106 are also shown.

As illustrated in FIG. 7A, a master clock signal is provided to central arbiter 150. (As previously described, this master clock signal advantageously operates at a high frequency, for example, 250 MHz.) Receiver 152 then couples the master clock signal to driver 154, Divide-By-N Counter 160, and flip-flop 162. Driver 154 couples the master clock signal to the global clock line 101, thereby effectively distributing the "master clock signal" as the previously described "global clock signal." Divide-By-N Counter 160 divides the master clock signal by a predetermined number "N" in order to provide the present invention with a global clock enable signal. In essence, once every "N" master clock cycles, Divide-By-N Counter 160 outputs a global clock enable signal for one cycle. Thus, assuming the master clock signal frequency is 250 MHz, and N is 4, Divide-By-N Counter 160 outputs a global clock enable signal of 62.5 MHz. As will be described, this global clock enable signal is used in the bus structure to globally synchronize arbitration and consistency information.

Continuing to refer to FIG. 7A, the global clock enable signal output of Divide-By-N Counter 160 is coupled to driver 158 which then couples the global enable clock signal (GCKE), to global clock enable line 102. The global clock enable signal (GCKE) is thereby provided to the agents coupled to bus 100 over global clock enable line 102. In particular, as illustrated in this figure, the global clock enable signal (GCKE) is provided to agent 110, where receiver 124 couples the global clock enable signal (GCKE) to the enable input for flip-flop 126. Thus, it will be noted from this figure that while flip-flop 126 is clocked with the high-speed global clock signal provided over global clock line 101, flip-flop 126 is only enabled at the rate of the global clock enable signal (GCKE).

The processing of bus requests will now be described with reference to FIGS. 7A and 7B. In operation, when an agent such as agent 110 wants control of the bus, it must request control of the bus from the central arbiter 150, which typically processes multiple requests for control of the bus. Assume, for example, that agent 110 wants control of the bus. Agent 110 initially couples its request to flip-flop 126. As illustrated, flip-flop 126 receives the high-frequency globally distributed clock signal (GCK) in its clock input. However, flip-flop 126 is only enabled to change under the control of the global clock enable signal (GCKE) which, as previously described, is coupled to the enable input of flip-flop 126. Thus, it can be appreciated that requests for access to the bus are made under the timing and control of the global clock enable signal (GCKE).

After the request is coupled to request line 106, this request is coupled to the central arbiter 150. As illustrated, receiver 156 couples the request to flip-flop 162. Flip-flop 162 is clocked with a high speed clock signal, in this case the master dock signal, but enabled by a slow clock signal generated by Divide-By-N Counter 160. Thus, arbitration requests are processed by the central arbiter 150 under the control of the slow clock enable signal. A timing diagram for the processing of arbitration requests is illustrated in FIG. 7B.

It will be appreciated from the foregoing description, that by distributing the global clock enable signal (GCKE) over global clock enable line 102, the central arbiter 150 effectively indicates to each agent coupled to the bus when it is appropriate to make an arbitration request. It will be appreciated that the global clock enable signal (GCKE) effectively controls the transfer of what can be termed "interactive messages," namely, messages in the system which ultimately require some form of coordination between messages coming from more than one source. An arbitration request is an example of an "interactive message." For, example, when the bus must be allocated to a requesting agent, and there are multiple contending agents, these requests originate from more than one source and must be coordinated by the central arbiter 150. In the present invention, such "interactive messages" are advantageously transferred in a globally synchronous fashion, at a relatively slow rate when compared to the rate at which data is transferred.

In contrast to an "interactive message," a "non-interactive message" does not require coordination between messages coming from more than one source. The transfer of data can be considered the transfer of a "non-interactive message." The data or "non-interactive message" is simply sent from one source, a sending agent, to one or more receiving agents. No coordination of messages from more than one source is involved. The present invention advantageously transfers such "non-interactive messages" in a high-speed, source synchronized fashion. The present invention's elimination of resynchronization and the possibility of metastability will now be described.

In prior art systems utilizing high-speed, source synchronized data transfers, resynchronization was typically needed in the receiving agent. The receiving agent usually received data in a data buffer, then responded to certain signals or flags from the data buffer indicating when the data was available to the receiving agent to be read from the data buffer. In such systems, the data was ultimately read out of the data buffer, but at the risk of producing metastability. Accordingly, these systems frequently utilized a series of flip-flops to reduce the likelihood of such metastability. As will be described, the present invention eliminates metastability by sending from the central arbiter to the receiving agent a signal indicating that the transferred data is available to be read out of the data buffer.

Figure 8:
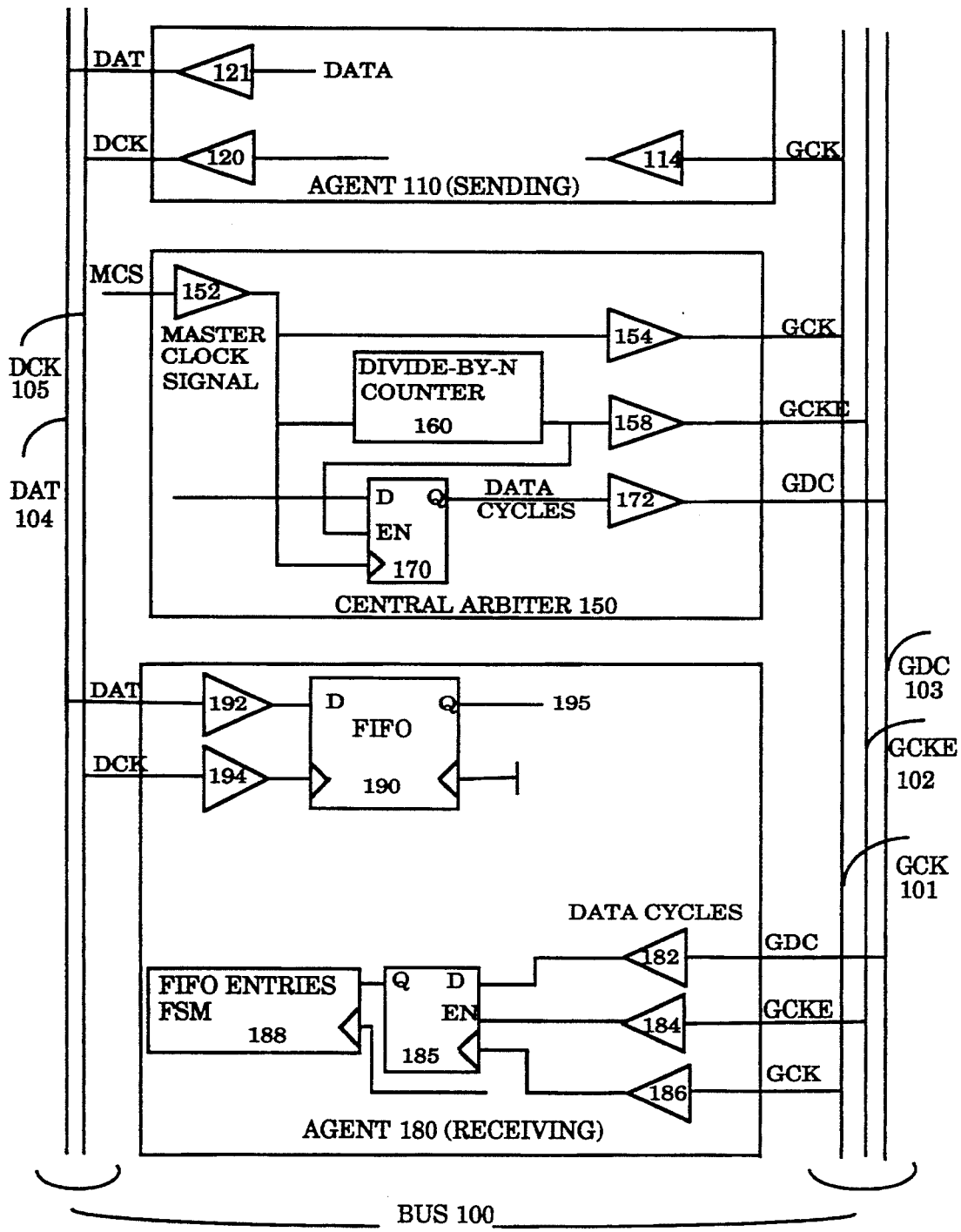
FIG. 8 illustrates the method and apparatus of present invention for eliminating resynchronization and metastability.

Referring now to FIG. 8, this figure illustrates the apparatus and method of the present invention which eliminates metastability. Agent 110, central arbiter 150, and agent 180 are shown coupled to bus 100. The global clock line 101, data lines 104, data clock line 105, global clock enable line 102 and global data cycles lines 103 are illustrated. As shown in this figure, and previously described, central arbiter 150 includes drivers 154 and 158, receiver 152, as well as Divide-By-N Counter 160, which provides a global clock enable signal (GCKE) over global clock enable line 102. Central arbiter 150 further includes a data cycles multi-bit flip-flop 170 coupled to a driver 172. Receiving agent 180 includes receivers 192 and 194 coupled to FIFO 190, the output of which is read by the receiving agent at point 195. The receiving agent further comprises receivers 182, 184, and 186, coupled to a multi-bit flip-flop 185. Multi-bit flip-flop 185 is, in turn, coupled to a FIFO Entries Finite State Machine 188.

Referring to FIG. 8, assume sending agent 110 wishes to send data to receiving agent 180. Assuming the bus is available, in response to a request from sending agent 110, the central arbiter 150 grants sending agent 110 the right to send data over the bus. (Request line 106 and bus grant line 108 are not shown in this figure.) As described earlier with reference to FIG. 6, the high-speed global clock signal (GCK) from global clock line 101 is then forwarded through sending agent 110 to the data clock line 105. Synchronous with this, data (DAT) is coupled to data line 104, and provided to FIFO 190 in receiving agent 180.

It can be appreciated that a certain number of cycles after the sending agent 110 has started sending data, the central arbiter 150 actually knows that data must be in FIFO 190. Essentially, central arbiter 150 knows this because it granted the bus to the sending agent 110 to send data to the receiving agent 180. Central arbiter 150, therefore, advantageously sends, at the global clock enable (GCKE) rate, information to the receiving agent 180 indicating that it can now take data out of FIFO 190. This information, indicating the number of data cycles transferred, is coupled from multi-bit flip-flop 170, through driver 172, to the global data cycles (GDC) lines 103. The data cycles information is then provided over global data cycles (GDC) lines 103 to the receiving agent 180. In particular, the data cycles information is coupled to multi-bit flip-flop 185. Multi-bit flip-flop 185 is clocked at the fast global clock rate but enabled at the slower global clock enable rate. Thus, every "N" global clock cycles, multi-bit flip flop 185 is enabled, and the number of data cycles within that "N" cycle period is loaded into multi-bit flip-flop 185. This number is then coupled to FIFO Entries Finite State Machine 188 which comprises logic to keep track of the data cycles information and thereby advise the receiving agent 180 when it can read the data out of FIFO data buffer 190.

It will be appreciated that by communicating data cycles information at the slower global clock enable signal (GCKE) rate, central arbiter 150 is accomplishing the previously described process in a globally synchronous fashion which doesn't require resynchronization. The central arbiter 150 can, if desired, advantageously wait a prescribed number of global clock signal (GCK) cycles, for example 4 or 5 cycles, before providing this information, thereby insuring that the data stored in FIFO data buffer 190 is stable before being read out.

Figure 9:
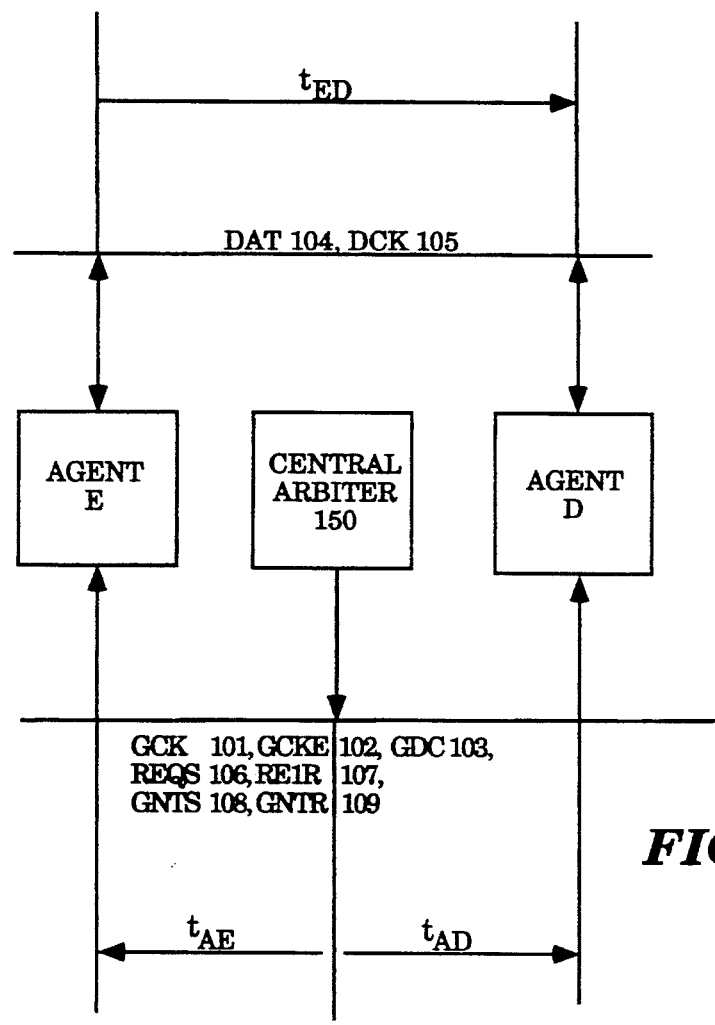
FIG. 9 illustrates the present invention's advantageous placement of the central arbiter in the center of the bus.

Referring now to FIG. 9, this figure illustrates the present invention's advantageous placement of the central arbiter 150 in the middle of bus 100. Two agents, Agent E and Agent D are shown coupled to bus 100. In this figure, for the purpose of simplicity and clarity, bus lines 104 and 105 are consolidated in the upper portion of bus 100, while bus lines 101, 102, 103, 106, 107, 108, and 109 are consolidated in the lower portion of bus 100. As previously described, the present invention is advantageously utilized within a system characterized by packet switched data transfers, cache-consistency, snooping, and pipelining of shared/owner information.

Assuming the bus of the present invention is utilized in conjunction with a packet switched protocol, the dead time between data packets can be calculated with reference to FIG. 9. Let $t_{xy}$ be the one way propagation delay on the bus between two points x and y. Let $t_d$ be the minimum time that must elapse between when central arbiter (A) 150 stops granting Agent E's packet and when the central arbiter (A) 150 starts granting Agent D's packet. To avoid overlapping packets, $t_d \geq t_{ED} + t_{AE} - t_{AD}$. This equation can be explained as follows. Assume initially, that the central arbiter (A) 150 stops granting Agent E's packet at time zero. At Agent D, E's packet stops at time $t_{AE} + t_{ED}$. At Agent D, Agent D's packet can start at time $t_d + t_{AD}$. To avoid overlap, $t_d + t_{AD} \geq t_{AE} + t_{ED}$. Thus, $t_d \geq t_{ED} + t_{AE} - t_{AD}$. However, $t_{ED} = t_{AE} + t_{AD}$; therefore, the preceding equation can be rewritten as $t_d \geq 2(t_{AE})$. Applying the same reasoning to the case where the central arbiter 150 stops granting agent D and starts granting Agent E, then to avoid overlap, the following must be true $t_d \geq 2(t_{AD})$.

The worst dead time for a given implementation corresponds to the case where agent E is placed at one end of the bus and agent D at the other end, and the control of the bus is transferred between these two agents. From the previous equations, the worst dead time to avoid overlap is: $t_d \geq \text{Max}[2(t_{AE}), 2(t_{AD})]$ which can be rewritten as $t_d \geq \text{Max}[2(t_{AE}), 2(t_p - t_{AE})]$ where $t_p$ is the one way, end-to-end propagation delay of the bus. It will be appreciated from the preceding equation that if the central arbiter 150 is placed in the center of the bus 100, then the central arbiter 150 need never leave a dead time of more than $t_p$ between packets. This holds true regardless of the position of the agents which are exchanging control of the bus. However, the central arbiter 150 could be designed to wait less than $t_p$ between packets in particular situations, based upon knowledge of the locations of these agents.

Figure 10A:
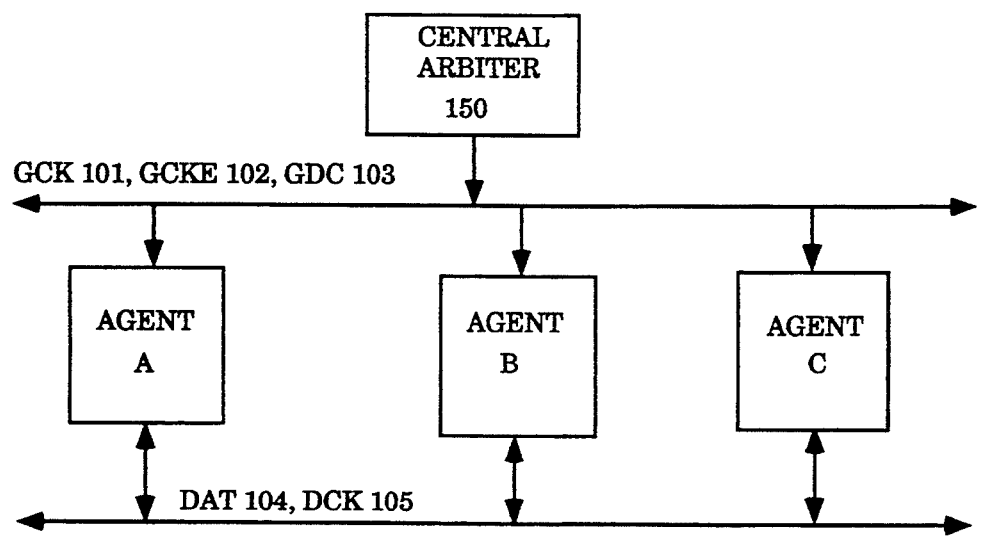
FIG. 10A illustrates three agents coupled to the bus of the present invention.

Referring now to FIG. 10A. this figure illustrates the coupling of three agents, an Agent A, an Agent B, and an Agent C, as well as the central arbiter 150, to the bus 100. For simplicity and illustrative purposes only, global clock (GCK) line 101, global clock enable (GCKE) line 102, global data cycles (GDC) line 103 are consolidated in the upper portion of bus 100. (Not shown are the individual bus request and bus grant lines for Agents A, B, and C). Data (DAT) line 104 and data clock (DCK) line 105 are also shown consolidated for simplicity and illustrative purposes only.

Figure 10B:
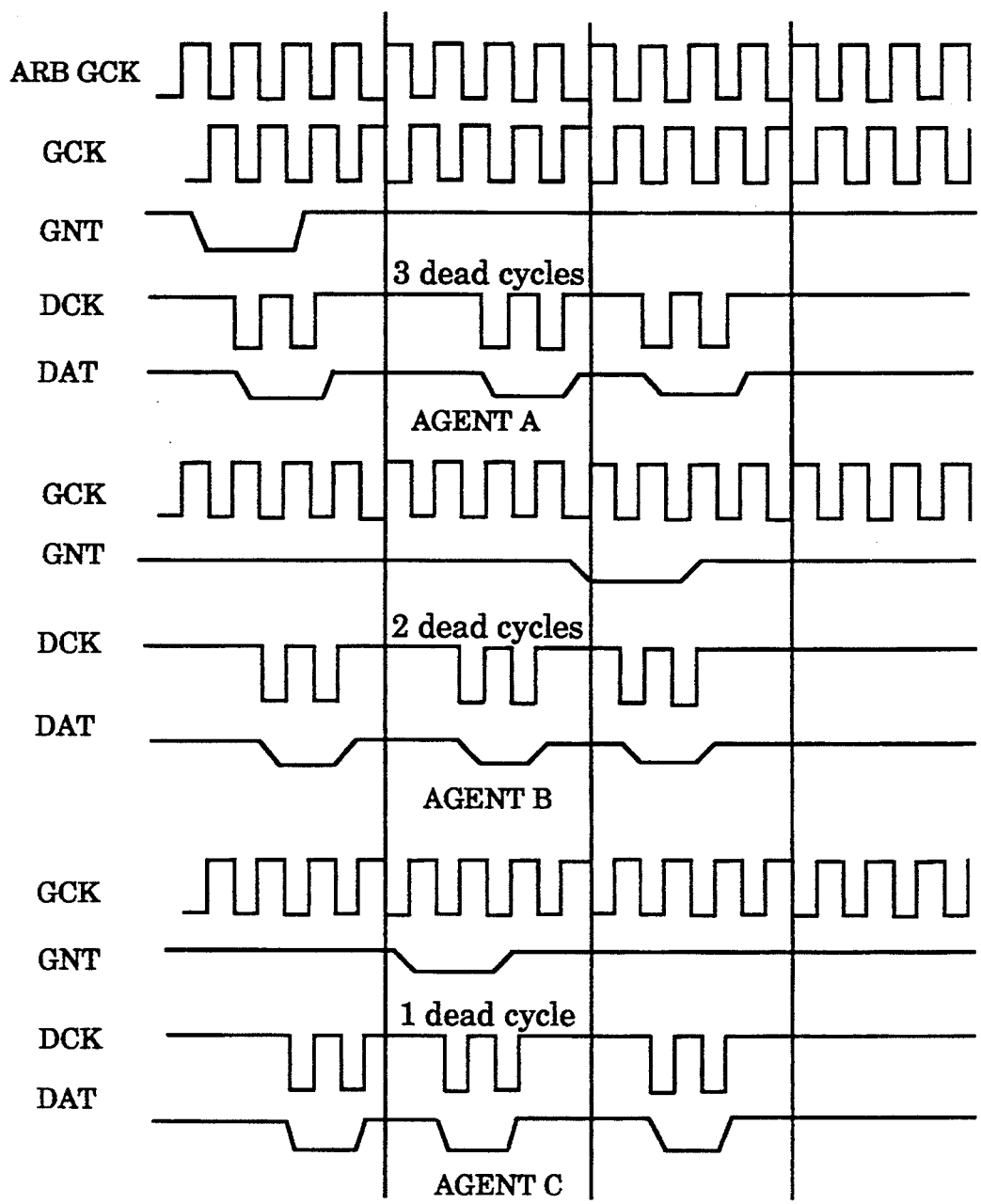
FIGS. 10B, 10C, 10D, and 10E illustrate timing diagrams for a variety of data transfer contexts.
Figure 10C:
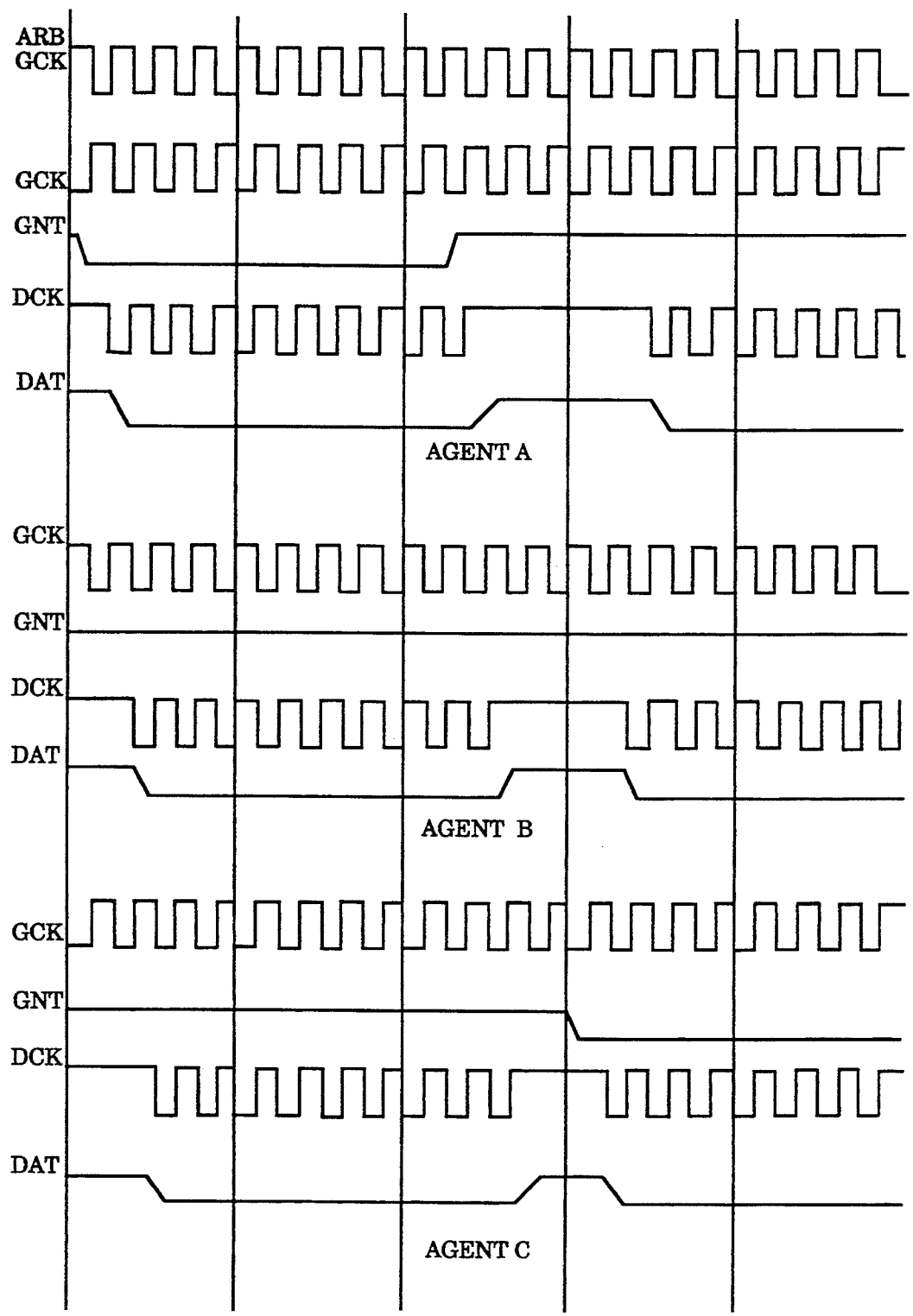
Figure 10D:
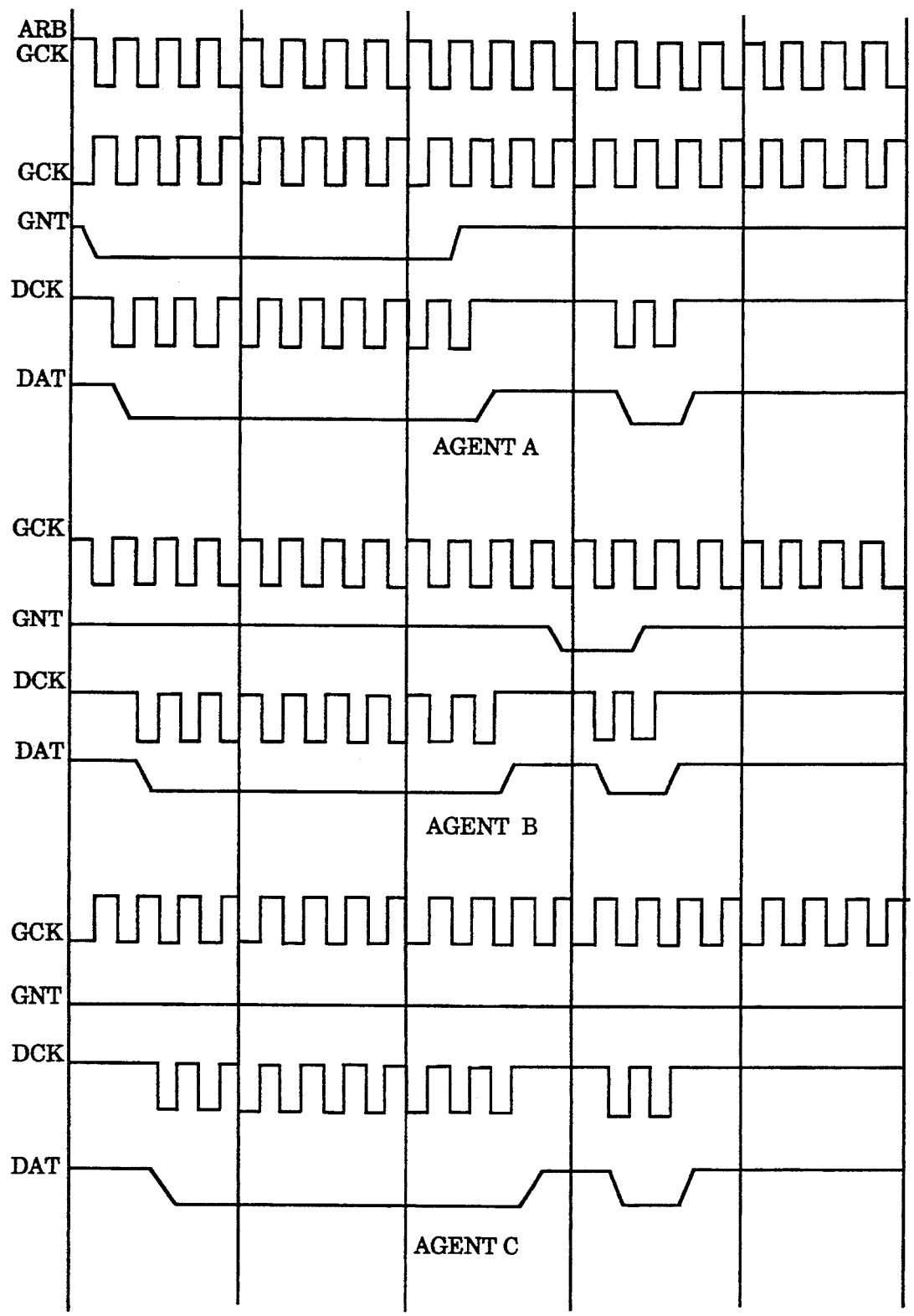
Figure 10E:
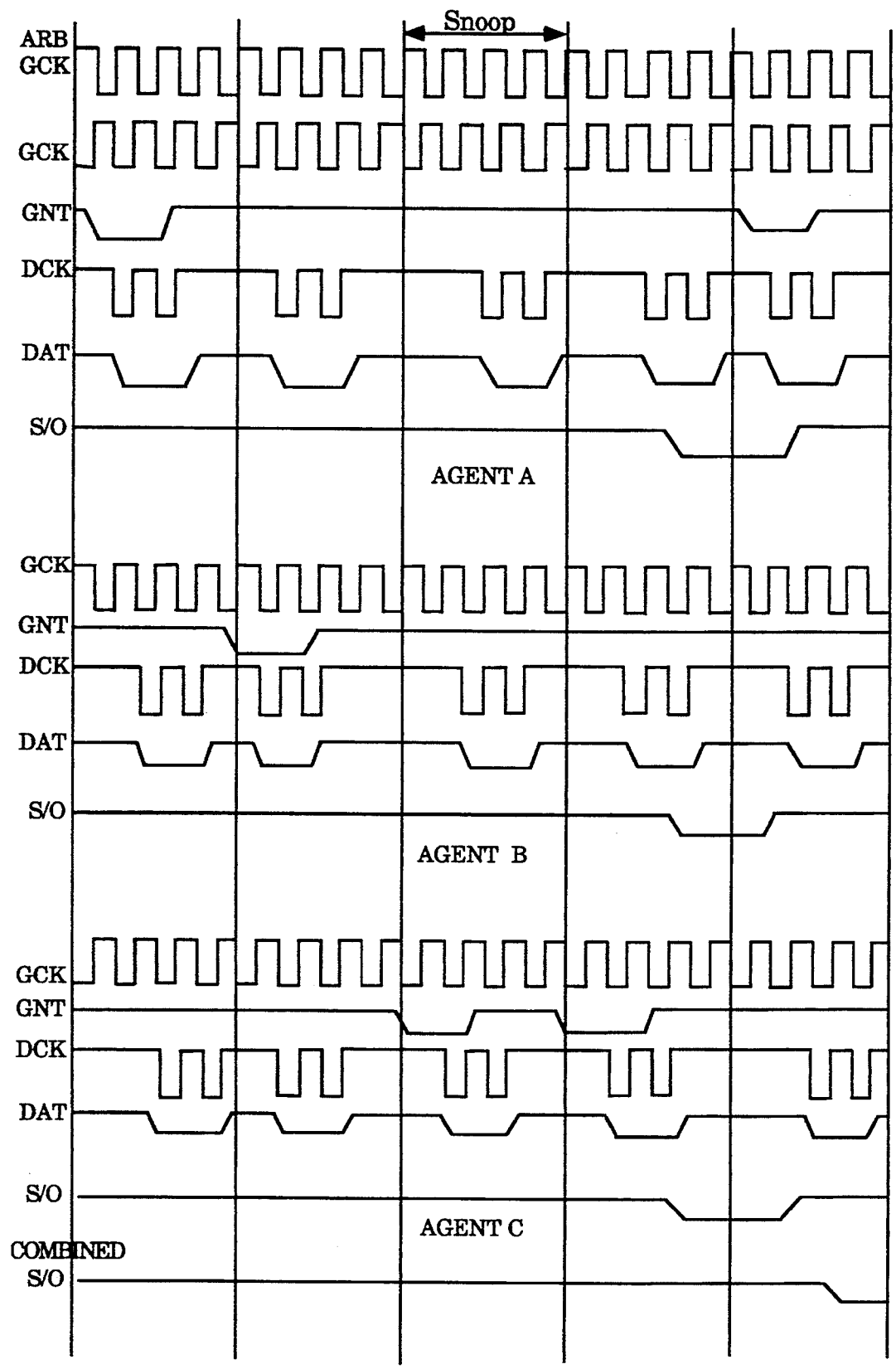

The timing diagrams shown in FIG. 10B, FIG. 10C, FIG. 10D, and FIG. 10E illustrate the signals realized at the three agents shown in FIG. 10A under different data transfer scenarios. FIG. 10B illustrates the signals realized in the case of back-to-back 2 cycle packets. The top signal corresponds to the global clock signal (GCK) as outputted by the central arbiter. The global clock signal (GCK) is then illustrated as received at Agent A, Agent B, and Agent C. The bus grant signals (GNT), the data clock signals (DCK), and the data signals (DAT) are also shown for Agent A, Agent B, and Agent C. FIG. 10C illustrates a timing diagram for back-to-back 9 cycle packets. FIG. 10D illustrates a timing diagram for a 9 cycle packet followed by a 2 cycle packet. FIG. 10E illustrates shared/owner latency timing diagrams. An additional shared/owner signal is shown for each of the agents, with a combined shared/owner signal shown at the bottom of FIG. 10E. As previously described, and depicted in this figure, the present invention is advantageously used within such a protocol making use of snooping and cache consistency.

The data bandwidth of the present invention can be calculated once system parameters are known. Assume the following parameters: a bus width of 8 parity protected bytes, a global clock signal of 250 MHz, a global clock enable signal of 62.5 MHz, packets starting on cycles divisible by 4, data transfer blocks equal to 64 bytes, a bus length of 12 inches with a one way trip of approximately 1 global clock cycle, request packets of 2 or 9 cycles, reply packets of 2 or 9 cycles, and an average dead time between packets of 2 or 3 cycles. Under these conditions, the bus of the present invention has a peak bandwidth of 2 GB/s. Assuming 70% ReadBlock, 20% WriteBlock, and 10% of miscellaneous packets, the bus of the present invention has a data bandwidth of 1 GB/s.

Thus, the bus of the present invention can readily support a wide variety of systems. For example, the present invention can readily be used with the basic system illustrated in FIG. 1, with no external cache, and a data cache with an internal write-through policy. The present invention is also particularly well suited for a mid-range system utilizing an external cache with a write-back policy. In addition, the present invention will readily support a high-end server. Clearly, the level of performance provided by the present invention makes it suitable for applications over the entire range of systems, from low-end workstations to high-end servers and beyond.

Figure 11:
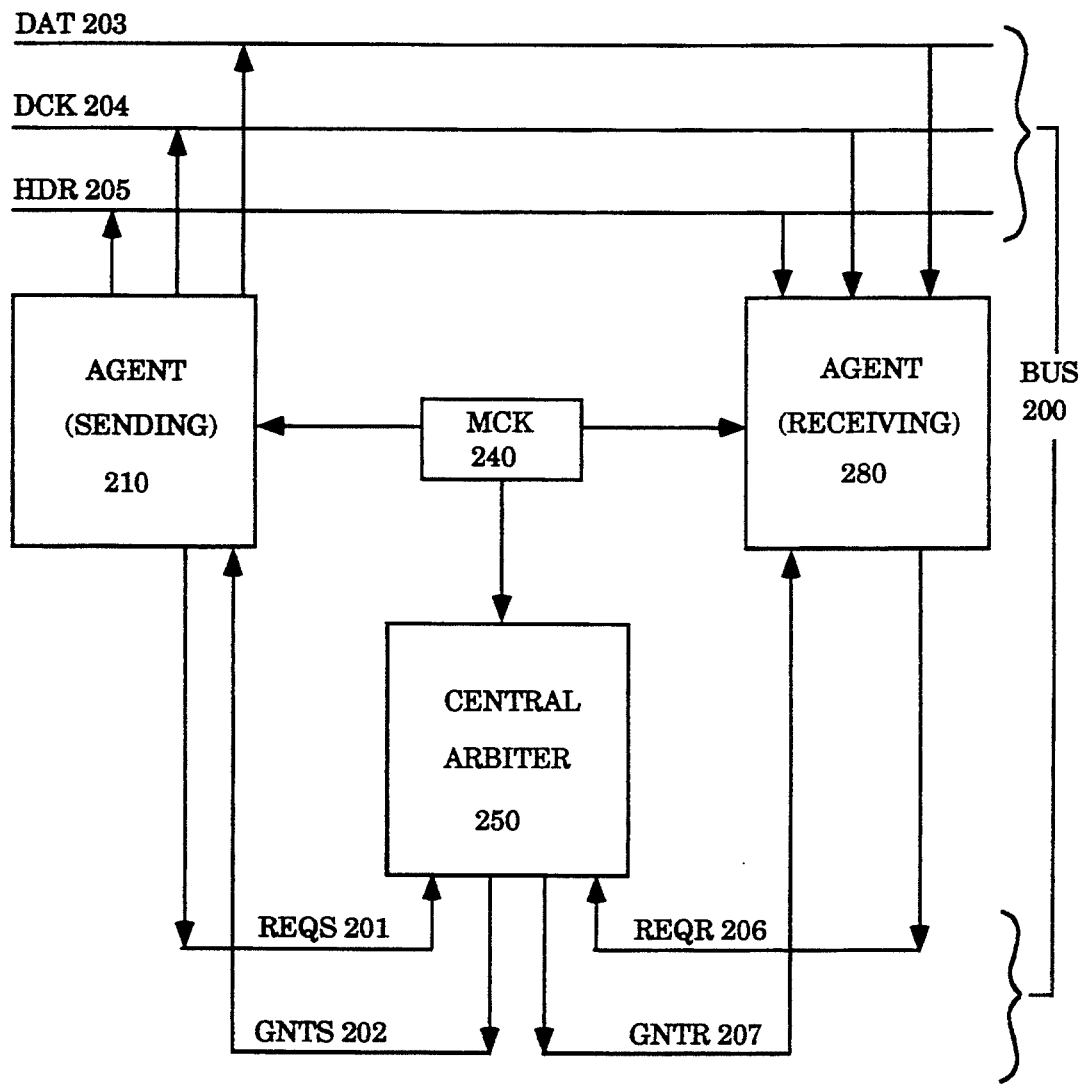
FIG. 11 illustrates, in block diagram form, an alternative embodiment of the present invention.

Referring now to FIG. 11, this figure illustrates in block diagram form, an alternative embodiment of the present invention. As with the preceding embodiment, this embodiment utilizes high-speed source synchronized data transfers and lower speed globally synchronized transfers of arbitration and consistency information. In this alternative embodiment, a central arbiter 250 arbitrates requests for control of a bus 200. Bus 200 includes data (DAT) lines 203 (for simplicity and clarity only one data line is shown), data clock line (DCK) 204, header line (HDR) 205, bus request (REQS) line 201, bus request (REQR) line 206, bus grant (GNTS) line 202, and bus grant (GNTR) line 207. Also shown are agent 210 and agent 280 coupled to bus 200. As previously noted with respect to the preceding embodiment, the present invention is in no way limited to such a two agent context chosen for illustrative purposes only.

With reference to FIG. 11, it will be appreciated that in contrast to the preceding embodiment, the alternative embodiment distributes a master clock signal directly to each agent coupled to the bus, as well as the central arbiter 250. (Equal length traces are preferably used for the master clock lines to minimize clock skew between two agents and between the central arbiter 250 and agents.) The central arbiter 250, itself, does not distribute a global clock. In further contrast to the previously described embodiment, in this embodiment, the master clock signal operates at a relatively low frequency, for example, 62.5 MHz. Bus request signals and bus grant signals, previously described as a type of "interactive information," are handled by the central arbiter 250 synchronous with this lower frequency master clock signal.

For high-speed source synchronized data transfers, each agent internally generates a fast clock signal (FCK), 1/Nth of whose frequency is phase-locked using prior art phase-locked-loop techniques, to the just described lower frequency master clock signal coupled to each agent. This fast clock signal (FCK) is thus "N" times faster than the master clock signal, where "N" is advantageously chosen to facilitate high-speed source synchronized data transfers. For example, assuming the master clock signal is operating at 62.5 MHz, and N=4, then the fast clock signal (FCK) would operate at 250 MHz and (FCK) divided by 4 would be phase locked to the master clock.

From the fast clock signal (FCK) a high speed data clock signal (DCK) is generated, and utilized to accomplish high speed source synchronized data transfer. The (DCK) signal is identical in frequency and phase to (FCK). For example, in operation, when agent 210 is granted control of bus 200, it couples its data to data line 203, and its high speed data clock signal (DCK) to data clock line 204. This alternative embodiment thus globally distributes a low frequency clock. The agents, themselves, then generate the high speed clock signal with a phase lock loop circuit. The source synchronized data transfer is then accomplished utilizing this high speed clock signal.

Figure 12:
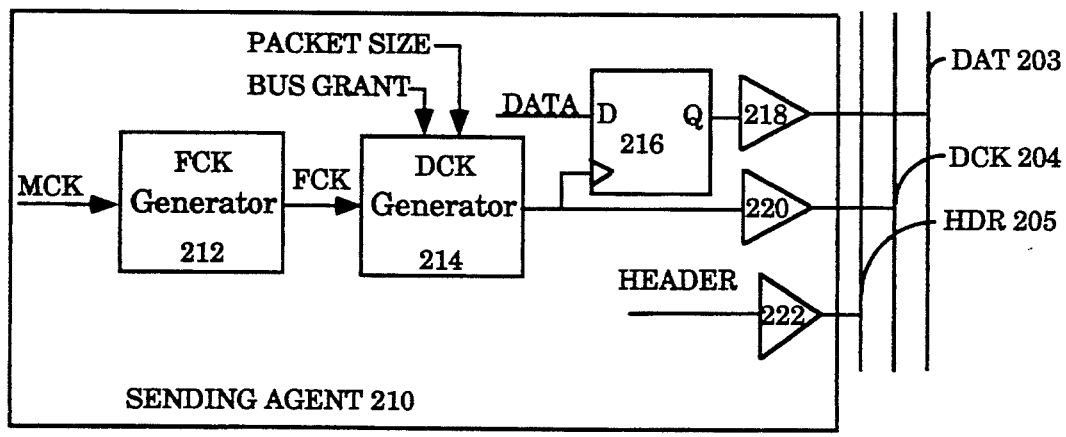
FIG. 12 illustrates in simplified form the circuitry in the sending agent utilized to accomplish high speed source synchronized data transfers.

Referring now to FIG. 12, this figure illustrates, in simplified form, the circuitry in the sending agent utilized to accomplish high speed source synchronized data transfers in this alternative embodiment. This circuitry includes drivers 218, 220, and 222, a flip-flop 216, a data clock (DCK) generator 214, and a fast clock (FCK) generator 212. Also shown are data lines (DAT) 203, data clock line (DCK) 204, and header line (HDR) 205.

Figure 13:
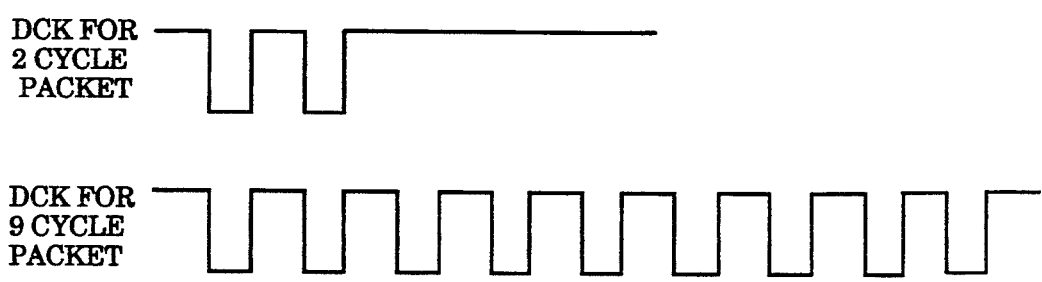
FIG. 13 illustrates the data clock signals for a two cycle packet and a nine cycle packet.

In operation, the fast clock generator 212 generates a fast clock signal (FCK), 1/Nth of whose frequency is phase-locked using prior art phase-locked-loop techniques, to the lower frequency master clock signal coupled to each agent. This fast clock signal (FCK) is coupled to the data clock generator 214. Signals indicating the packet size and the bus grant are also coupled to the data clock generator 214. The data clock generator 214 generates a data clock signal (DCK) corresponding to the size of the data packet being sent. For example, the data clock generator provides a two pulse data clock signal for a two cycle packet, and a nine pulse data clock signal for a nine cycle packet. FIG. 13 illustrates exemplary data clock signals for a two cycle packet and the data clock signal for a nine cycle packet. Returning to FIG. 12, data (DAT) is driven out of flip-flop 216 synchronous with the data clock signal (DCK) generated from the data clock generator 214. The data (DAT) is then coupled to data line 203 synchronous with the coupling of the data clock signal (DCK) to the data clock line 204. In this way, high speed source synchronized data transfer is accomplished.

Figure 14:
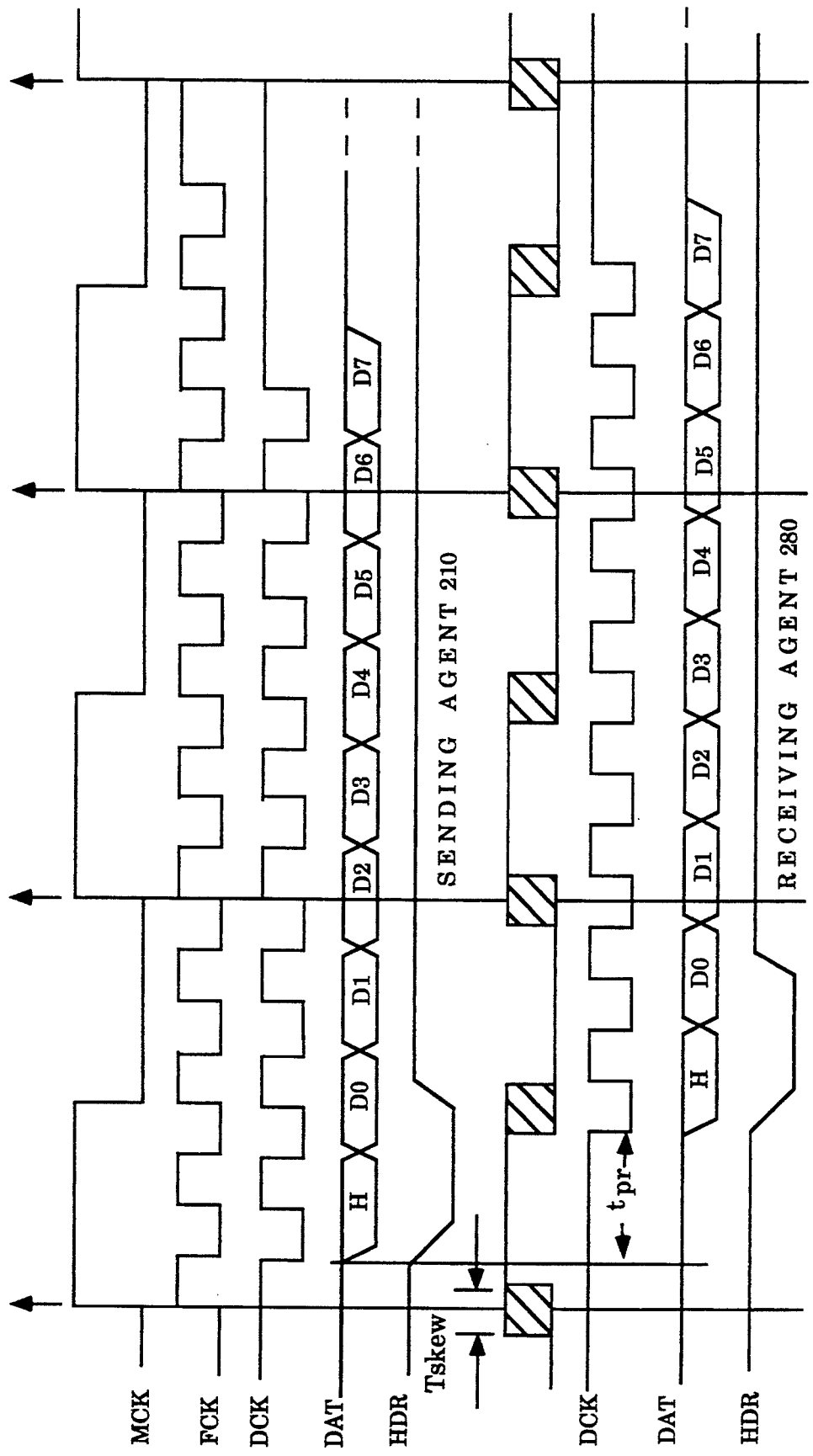
FIG. 14 illustrates a timing diagram for the data transfer signals utilized in the alternative embodiment.

Referring now to FIG. 14 this figure illustrates a timing diagram for the data transfer signals utilized in the alternative embodiment. The upper half of this figure illustrates the data transfer signals issued from a sending agent, while the lower half depicts the data transfer signals received at a receiving agent. Starting from the top of FIG. 14, the low frequency master clock signal is illustrated. Below the master clock signal, the phase-locked fast clock (FCK) signal generated by the sending agent is shown. The data clock (DCK) signal is next illustrated, with the signal depicted corresponding to a nine pulse signal for a nine cycle packet. Below the data clock signal, the data packet, and the header signal are shown. After a propagation delay, $T_{prop}$, the header, the data, and the data clock signal are received by a receiving agent. In order to provide for a maximum safety margin for differences in propagation velocity of the data signal and the data clock signal, the sending agent advantageously drives the data on the falling edge of the data clock signal, and the receiving agent samples the data on the rising edge of the data clock signal.

In order to avoid packet overlap in this alternative embodiment, there must be a minimum "dead time" between two packets. Assume the following defined terms: $T_d$ is this dead time; $T_p$ is the maximum one way propagation time for signals on the bus, $T_{skew}$ is the maximum client to client skew in the master clock; and $\Delta T_{dr}$ is the maximum differential driver delay between two clients. This dead time should then satisfy the following equation: $T_d > T_p + T_{skew} + \Delta T_{dr}$.

Figure 15:
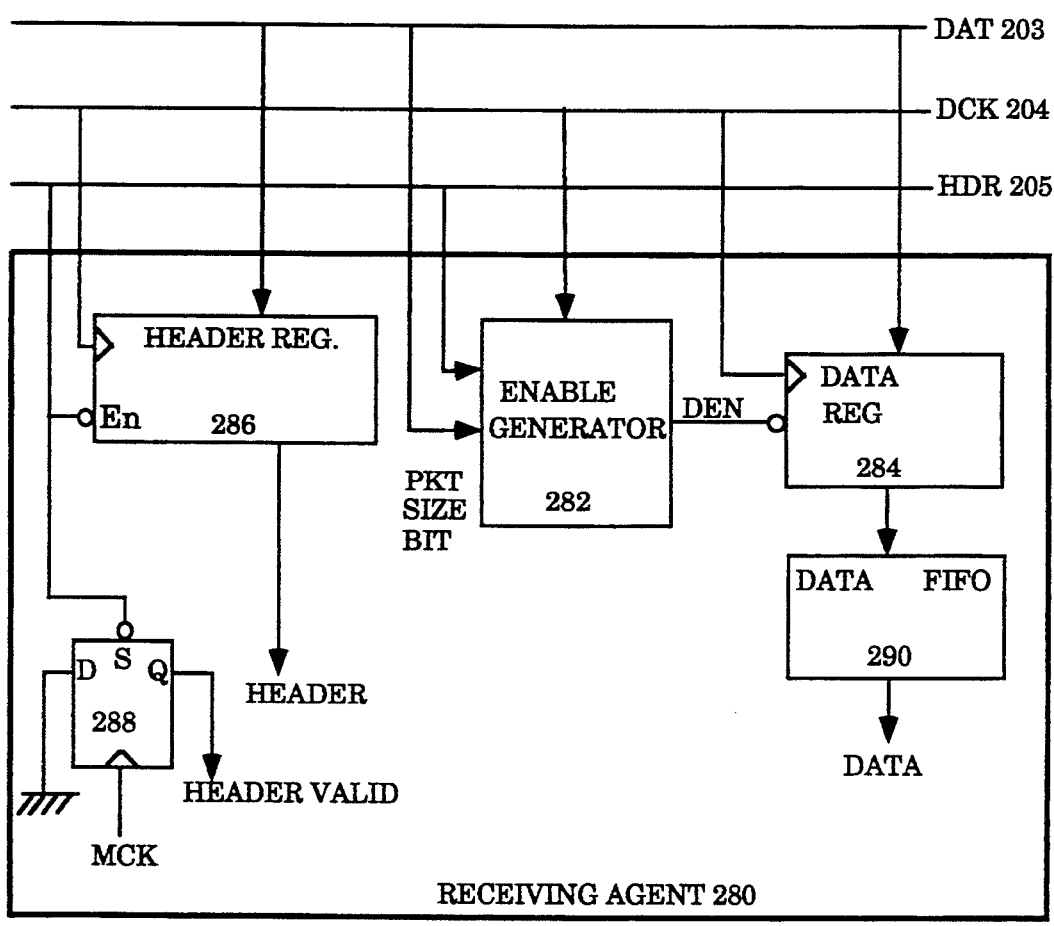
FIG. 15 illustrates, in simplified form, the circuitry in the receiving agent used to receive source synchronized data transfers.
Figure 16A:
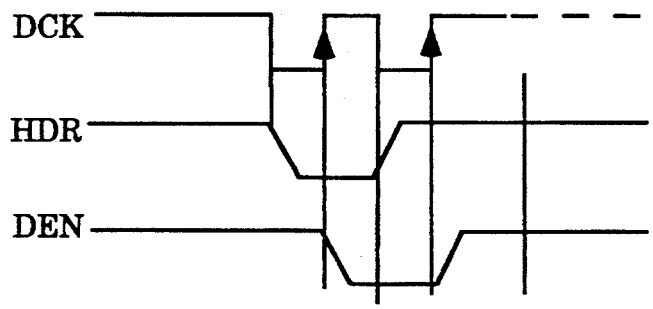
FIGS. 16A and 16B illustrate the enable waveforms for a two cycle packet and a nine cycle packet.
Figure 16B:
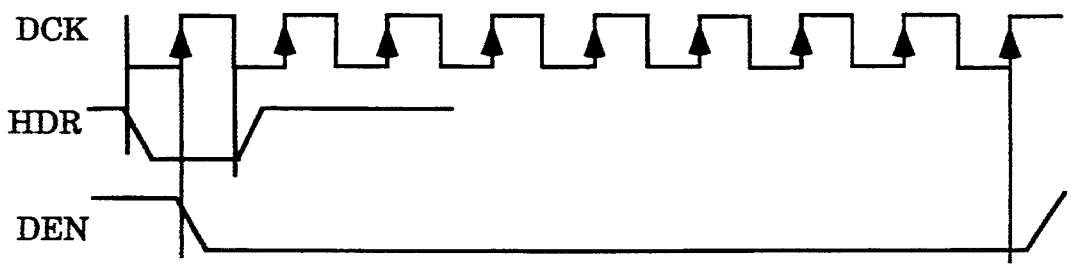

Referring now to FIG. 15, this figure illustrates in simplified form, the circuitry in receiving agent 280 utilized to receive source synchronized data transfers. This circuitry includes: an enable generator 282, a data register 284, a data FIFO 290, a header register 286 and a header valid flip-flop 288. Also shown in FIG. 15, are data line (DAT) 203, data clock line (DCK) 204, and header line (HDR) 205. In a data transfer operation, the enable generator 282 is used to generate an enable pulse that is dependent upon the size of the data packet being transferred. Referring briefly to FIGS. 16A and 16B, these figures illustrate the enable generator waveforms (DEN) for a 2 cycle packet and a 9 cycle packet. It can be noted that the DEN waveform for a 2 cycle packet is 1 cycle long, while the DEN waveform for a 9 cycle packet is 8 cycles long. The DEN waveform generated by the enable generator 282 enable is then coupled to data register 284. Data register 284 accepts the data from data line (DAT) 203 under the control of the DEN waveform provided to its enable input and the data clock signal provided over data clock line 204 to its clock input. Data in the data register 284 is coupled to data FIFO 290 from which the data is then read by the receiving agent 280 once the header valid signal is asserted.

The alternative embodiment of the present invention provides for the elimination of metastability by sending a header signal at the start of a data packet, which tells the receiving agent that a data packet has started. Referring now to FIGS. 11, 12, and 15, this header signal is transmitted from sending agent 210 to receiving agent 280 over header line 205. The header signal is sent on the slower, global master clock signal and received by the receiving agent on the same master clock signal. Thus, its transmission and reception can be guaranteed without the occurrence of metastability.

Referring specifically to FIG. 15, the data signal, the data clock signal, and the header signal are coupled to the header register 286. The header signal, transmitted from a sending agent on the slower, globally distributed master clock signal, is coupled to the enable input of header register 286 and to the set input of the header valid flip-flop 288. The header signal, therefore, acts as an enable for the header register which is used to store the first (or header) cycle of an incoming packet. The header signal also causes the Header Valid signal (the output of flip-flop 288) to become 1 indicating that a packet has arrived. Note that the header valid flip-flop 288 is clocked by the global master clock MCK, and its D input is set to zero permanently. Thus, immediately after each positive edge of MCK, the Header Valid signal goes to zero. It is set to 1 asynchronously by the HDR signal, but this signal is guaranteed to never make a transition close to the positive going edge of MCK. (See FIG. 14 for the phase relationship between MCK and HDR at both the sending and receiving agents.)

While the present invention has been particularly described with reference to FIGS. 1 through 16 and with emphasis on certain digital designs, it should be understood that the figures are for illustration only and should not be taken as limitations upon the invention. In addition, it is clear that the methods and apparatus of tile present invention have utility in a wide variety of data processing systems. The selection of certain data processing environments for purposes of illustration, and the absence of specific references to each and every data processing system within which the present invention can be advantageously utilized should not be taken as an expression of any limitation upon the wide applicability of the present invention. It is further contemplated that many changes and modifications may be made, by one of ordinary skill in the art, without departing from the spirit and scope of the invention as disclosed above.

We claim:

1. In an information processing system comprised of a plurality of information processing agents ("agents") coupled to a bus, a method of transferring data from at least one sending agent to at least one receiving agent over said bus comprising the steps of:
coupling a first clock signal over said bus to said at least one sending agent;
utilizing said first clock signal to accomplish a source synchronized data transfer over said bus from said at least one sending agent to said at least one receiving agent.

2. The method of transferring data as provided in claim 1, wherein said information processing system further comprises a central arbiter, said central arbiter coupled to said bus, and said first clock signal is coupled to said at least one sending agent from said central arbiter.

3. The method of transferring data as provided in claim 1, further comprising the step of:
coupling a second clock signal to said at least one sending agent, said second clock signal controlling the timing of a bus request from said at least one sending agent to said central arbiter, and the timing of a bus grant from said central arbiter to said at least one sending agent.

4. The method of transferring data as provided in claim 3, further comprising the step of:
coupling a data available signal from said central arbiter to said at least one receiving agent, said data available signal indicating the availability of transferred data to said at least one receiving agent, wherein said data available signal is coupled from said central arbiter to said at least one receiving agent under the timing of said second clock signal.

5. The method of transferring data as provided in claim 1, wherein said step of utilizing said first clock signal to accomplish a source synchronized data transfer includes:
utilizing said first clock signal to generate a clock signal which is phase-locked to said first clock signal; and
utilizing said phase-locked clock signal to accomplish said source synchronized data transfer.

6. The method of transferring data as provided in claim 5 wherein said first clock signal controls the timing of requests by said first agent for control of said bus.

7. The method of transferring data as provided in claim 5 further comprising the step of:
coupling a data available signal from said at least one sending agent to said at least one receiving agent under the timing control of said first clock signal, said signal indicating the availability of transferred data to said at least one receiving agent.

8. A bus system comprising:
a bus;
a central arbiter coupled to said bus for arbitrating among a plurality of requests for control of said bus;
a first data processing agent coupled to said bus;
a second data processing agent coupled to said bus;
wherein said bus is comprised of a plurality of lines including:
a first clock line for carrying a first clock signal, said first clock line coupled to said first data processing agent;
a data clock line coupled to said first data processing agent and said second data processing agent, for coupling a data clock signal from said first data processing agent to said second data processing agent in a source synchronized data transfer;
a data line coupled to said first data processing agent and said second data processing agent, for transferring data in a source synchronized data transfer;
wherein said first data processing agent includes means for coupling said first clock signal to said data clock line.

9. The bus system as provided in claim 8, wherein said first clock line is further coupled to said central arbiter, and said central arbiter includes means for providing said first clock signal to said first clock line.

10. The bus system as provided in claim 9, wherein said plurality of lines further includes:
a second clock line for carrying a second clock signal, said second clock line coupled to said first data processing agent and said central arbiter,
wherein said central arbiter includes means for providing said second clock signal to said second clock line.

11. In an information processing system comprised of a plurality of information processing agents ("agents"), a system for transferring messages among said agents comprising:
first interconnection means providing for the sending of at least one interactive message from at least one of said plurality of agents to at least one other agent of said plurality of agents in a globally synchronous manner;
second interconnection means providing for the sending of at least one non-interactive message from at least one of said plurality of agents to at least one other agent of said plurality of agents in a source-synchronized manner;
wherein each of said plurality of data processing agents includes decision means for making a determination of when a non-interactive message received by the agent through said second interconnection means may be processed without risk of errors due to metastability, said determination based upon at least one interactive message received by the agent through said first interconnection means.

12. The system as provided in claim 11, further comprising arbitration means for deciding which of said plurality of agents may send a non-interactive message at any given time.

13. The system as provided in claim 12, wherein said arbitration means relies upon at least one interactive message to decide which of said plurality of agents may send a non-interactive message at any given time.

14. The system as provided in claim 13, wherein said arbitration means comprises a central arbiter.

15. The system as provided in claim 14 wherein said central arbiter couples a global clock signal to each of said plurality of agents.

16. The system as provided in claim 15 further comprising;
third interconnection means providing for the sending of at least one grant signal from said central arbiter to at least one agent of said plurality of agents, said grant signal indicating that said at least one agent may send at least one non-interactive message through said second interconnection means, wherein said grant signal is source-synchronized with respect to said global clock signal.

17. The system as provided in claim 15 wherein said second interconnection means is a bus.

18. The system as provided in claim 17 wherein said central arbiter is coupled to said bus in the center of said bus.

19. The system as provided in claim 11, wherein said first interconnection means comprises:
global clock means for coupling a global clock signal to each of said plurality of agents;

global clock enable means for coupling a global clock enable signal to each of said plurality of agents;

wherein said global clock enable signal is utilized in conjunction with said global clock signal to synchronize the sending of said at least one interactive message; and wherein, said second interconnection means comprises:

data clock means for outputting a data clock signal from at least one of said plurality of agents, said data clock signal derived from said global clock signal, wherein said data clock signal is used to synchronize the sending of said at least one non-interactive message.

20. The system as provided in claim 11, wherein said first interconnection means comprises:

global clock means for coupling a global clock signal to each of said plurality of agents; and wherein said global clock signal is utilized to synchronize the sending of said at least one interactive message; and wherein said second interconnection means comprises:

data clock means for outputting a data clock signal from at least one of said plurality of agents, said data clock signal derived from said global clock signal as a phase-locked multiple of said global clock signal;

wherein said data clock signal is used to synchronize the sending of said at least one non-interactive message.

* * * * *